US009769640B2

(12) United States Patent
Chong et al.

(10) Patent No.: US 9,769,640 B2
(45) Date of Patent: Sep. 19, 2017

(54) EMERGENCY CENTER SELECTION METHOD, DEVICE, AND SYSTEM

(71) Applicant: Huawei Technologies Co., Ltd., Shenzhen (CN)

(72) Inventors: Weiwei Chong, Shanghai (CN); Xiaobo Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/197,312

(22) Filed: Jun. 29, 2016

(65) Prior Publication Data
US 2016/0309314 A1 Oct. 20, 2016

Related U.S. Application Data

(63) Continuation of application No. PCT/CN2013/091210, filed on Dec. 31, 2013.

(51) Int. Cl.
*H04W 4/22* (2009.01)
*H04M 3/51* (2006.01)
(Continued)

(52) U.S. Cl.
CPC ........... *H04W 4/22* (2013.01); *H04M 3/5116* (2013.01); *H04W 36/0022* (2013.01); *H04W 64/006* (2013.01); *H04W 76/007* (2013.01)

(58) Field of Classification Search
CPC ............. H04W 36/0022; H04W 36/14; H04W 36/0005; H04W 72/1247; H04W 76/007
See application file for complete search history.

(56) References Cited

U.S. PATENT DOCUMENTS

| 2004/0152471 A1* | 8/2004 | MacDonald | .......... G01S 5/0252 455/456.1 |
| 2007/0004378 A1* | 1/2007 | Muhonen | ................ H04W 4/22 455/404.2 |

(Continued)

FOREIGN PATENT DOCUMENTS

| CN | 102037750 A | 4/2011 |
| CN | 102378140 A | 3/2012 |
| CN | 103339970 A | 10/2013 |

OTHER PUBLICATIONS

Written Opinion of the International Searching Authority for PCT/CN2013/091210.*

*Primary Examiner* — Dung Hong
(74) *Attorney, Agent, or Firm* — Leydig, Voit & Mayer, Ltd.

(57) ABSTRACT

The present application discloses an emergency center selection method, device, and system. The method includes: receiving, by an MME, a request message initiated by UE located in an LTE network for CSFB of an emergency call, and sending, to an eNB, a first notification message that carries an emergency call indication; and sending, to an MSC, a first handover request message that carries information about a cell of a 3G network or information about a cell that is of the LTE network and on which the UE currently camps, so that after the MSC receives the first handover request message, the MSC may select an emergency center according to the information about the cell of the 3G network or the information about the cell of the LTE network in the first handover request message, and further quickly set up a call connection between the UE and the emergency center.

18 Claims, 10 Drawing Sheets

(51) Int. Cl.
*H04W 36/00* (2009.01)
*H04W 64/00* (2009.01)
*H04W 76/00* (2009.01)

(56) References Cited

U.S. PATENT DOCUMENTS

| | | | |
|---|---|---|---|
| 2009/0311987 A1* | 12/2009 | Edge | H04Q 3/0045 455/404.1 |
| 2011/0170517 A1 | 7/2011 | Bakker et al. | |
| 2011/0256873 A1* | 10/2011 | Vikberg | H04W 60/04 455/436 |
| 2012/0002545 A1* | 1/2012 | Watfa | H04W 48/06 370/235 |
| 2012/0003974 A1* | 1/2012 | Nylander | H04W 24/02 455/435.2 |
| 2013/0309993 A1* | 11/2013 | Nishida | H04M 11/04 455/404.1 |
| 2014/0031003 A1* | 1/2014 | Shugart | G01S 5/02 455/404.2 |
| 2015/0163642 A1* | 6/2015 | Bates | H04W 4/043 455/404.2 |

* cited by examiner

EMERGENCY CENTER SELECTION METHOD, DEVICE, AND SYSTEM

CROSS-REFERENCE TO RELATED APPLICATIONS

This application is a continuation of International Application No. PCT/CN2013/091210, filed on Dec. 31, 2013, which is hereby incorporated by reference in its entirety.

TECHNICAL FIELD

The present application relates to the communications field, and in particular, to an emergency center selection method, device, and system.

BACKGROUND

Full coverage of a second generation (2G) or third generation network (3G) network, such as Global System for Mobile Communications (GSM) or Wideband Code Division Multiple Access (WCDMA), has been basically implemented.

With development of network technologies such as System Architecture Evolution (SAE) and Long Term Evolution (LTE) in a fourth generation network (4G) network, and with development of an enhanced high speed uplink packet access (HSPA) technology, a high speed downlink packet access (HSPA+) technology, and a worldwide interoperability for microwave access (WiMax) network technology, LTE networks or enhanced 3G networks have covered some urban areas and traffic hotspot areas. Therefore, in current communications networks, the LTE networks and the enhanced 3G networks coexist with a 2G or 3G network.

In 2G and 3G networks, a circuit switched (CS) domain is used to bear a conversational service such as a voice call, but in an LTE network and an enhanced 3G network, a packet switched (PS) domain is used to bear a conversational service.

Circuit switched fallback (CSFB) refers to fallback of user equipment (UE) covered by LTE to a CS domain network when the UE processes a voice service, so as to process the voice service in the CS domain network, thereby fulfilling an objective of reusing an existing CS domain device to provide a traditional voice service for a user in an LTE network.

When a user initiates an emergency session and the circuit switched fallback occurs, emergency call indication information needs to be carried, and a network needs to quickly select an emergency center according to location information of the user and then quickly set up an emergency call.

When the UE initiates an emergency call, an MSC (mobile switching center) receives the location information RNC ID of the user forwarded by an MME (mobility management entity), and selects an emergency center by using the RNC ID. However, because of a relatively large range of the RNC ID, there may be multiple emergency centers. Consequently, the MSC cannot quickly select an appropriate emergency center, and cannot quickly set up an emergency call, which leads to poor user experience.

SUMMARY

Embodiments of the present application provide an emergency center selection method, device, and system. During circuit switched fallback, an MSC selects an emergency center according to cell information carried in an emergency call indication that is carried by an MME, which narrows a selection range. Therefore, the MSC can quickly select an appropriate emergency center, and duration for setting up an emergency call is shortened.

To achieve the foregoing objective, the embodiments of the present application use the following technical solutions:

According to a first aspect, an emergency center selection method is disclosed, including:

receiving, by a mobility management entity MME, a request message initiated by user equipment UE located in a Long Term Evolution LTE network, where the request message is used to request circuit switched fallback CSFB for an emergency call;

sending, by the MME, a first notification message to an evolved NodeB eNB according to the request message, where the first notification message is used to instruct the eNB to hand over the UE from the LTE network to a 3G network for the CSFB, and the first notification message carries an emergency call indication, which is used to indicate to the eNB that the CSFB is triggered by the emergency call; and sending, by the MME, a first handover request message to a mobile switching center MSC, where the first handover request message carries the emergency call indication, which is used to instruct the MSC to hand over the UE from the LTE network to a circuit switched CS domain of the 3G network for the emergency call, and the first handover request message further carries information about a cell of the 3G network or information about a cell that is of the LTE network and on which the UE currently camps, so that the MSC selects an emergency center according to the information about the cell of the 3G network or the information about the cell of the LTE network.

With reference to the first aspect, in a first possible implementation manner, before the sending, by the MME, a first handover request message to a mobile switching center MSC, the method further includes:

receiving, by the MME, a handover required message sent by the eNB, where the handover required message carries the emergency call indication and the information about the cell of the 3G network.

With reference to the first aspect, in a second possible implementation manner, the information about the cell of the 3G network includes an identity of the cell of the 3G and the information about the cell of the LTE network includes an identity of the cell of the LTE network.

With reference to the first aspect, in a third possible implementation manner, after the sending, by the MME, a first handover request message to an MSC, the method further includes:

receiving, by the MME, a first handover response message that is sent by the MSC in response to the first handover request message, where the first handover response message includes information about a CS domain radio resource that is allocated by a base station of the 3G network to the UE; and sending, by the MME, a handover requirement response message to the eNB, where the handover requirement response message includes the information about the CS domain radio resource, and the information about the CS domain radio resource is used to hand over the UE from the LTE network to the CS domain of the 3G network for the CSFB.

With reference to the first aspect, in a fourth possible implementation manner, after the sending, by the MME, a first handover request message to an MSC, the method further includes:

sending, by the MME, a second handover request message to a serving general packet radio service support node SGSN, where the second handover request message is used to request the SGSN to hand over the UE from the LTE network to a packet switched PS domain of the 3G network for the CSFB;

receiving, by the MME, a second handover request response message sent by the SGSN, where the second handover request response message includes a PS domain radio access bearer RAB, and the PS domain RAB is used to hand over the UE from the LTE network to the PS domain of the 2G or 3G network; and sending, by the MME, a handover requirement response message to the eNB according to the second handover request response message, where the handover requirement response message includes the PS domain RAB, so that the eNB sends the PS domain RAB to the UE.

With reference to the first aspect, in a fifth possible implementation manner, after the sending, by the MME, a first handover request message to an MSC, the method further includes:

receiving, by the MME, a first handover request response message sent by the MSC, where the first handover request response message includes a radio access bearer RAB, and the RAB is a RAB whose domain identifier indicates a PS domain, or the RAB is a PS RAB; and sending, by the MME, a handover requirement response message to the eNB according to the first handover request response message, where the handover requirement response message includes the RAB, so that the eNB sends the RAB to the UE.

According to a second aspect, an emergency center selection method is disclosed, including:

receiving, by a mobile switching center MSC, a first handover request message sent by a mobility management entity MME, where the first handover request message is used to request the MSC to hand over user equipment UE from a Long Term Evolution LTE network to a circuit switched CS domain of a 3G network for circuit switched fallback CSFB of an emergency call, the first handover request message carries an emergency call indication, which is used to instruct the MSC to hand over the UE from the LTE network to the CS domain of the 3G network for the emergency call, and the first handover request message further carries information about a cell of the 3G network or information about a cell that is of the LTE network and on which the UE currently camps; and selecting, by the MSC, an emergency center for the UE according to the information about the cell of the 3G network or the information about the cell of the LTE network that is carried in the first handover request message.

With reference to the second aspect, in a first possible implementation manner, before the selecting, by the MSC, an emergency center for the UE according to the information about the cell of the 3G network or the information about the cell of the LTE network that is carried in the first handover request message, the method further includes:

receiving, by the MSC, a handover complete message sent by a base station of the 3G network, where the handover complete message is used to indicate that the UE has completed the handover from the LTE network to the CS domain of the 3G network; and receiving, by the MSC, an emergency call connection request message sent by the UE.

With reference to the second aspect or the first possible implementation manner of the second aspect, in a second possible implementation manner, the selecting, by the MSC, an emergency center for the UE according to the information about the cell of the 3G network or the information about the cell of the LTE network that is carried in the first handover request message specifically includes:

querying, by the MSC, a domain name server, so as to select, for the UE, the emergency center corresponding to the information about the cell of the 3G network or the information about the cell of the LTE network.

With reference to the second aspect, or the first or the second possible implementation manner of the second aspect, in a third possible implementation manner, the information about the cell of the 3G network includes an identity of the cell of the 3G and the information about the cell of the LTE network includes an identity of the cell of the LTE network.

With reference to the second aspect, the first possible implementation manner of the second aspect, the second possible implementation manner of the second aspect, or the third possible implementation manner of the second aspect, in a fourth possible implementation manner, after the receiving, by an MSC, a first handover request message sent by an MME, the method further includes:

sending, by the MSC, a third handover request message to the base station of the 3G network, where the third handover request message is used to request the base station of the 3G network to allocate a CS domain resource to the UE for the handover to the CS domain of the 3G network;

receiving, by the MSC, a third handover request response message sent by the base station of the 3G network, where the third handover request response message includes information about the CS domain radio resource that is allocated by the base station of the 3G network to the UE for the handover to the CS domain of the 3G network; and sending, by the MSC, a first handover response message to the MME, where the first handover response message includes the information about the CS domain radio resource.

With reference to the second aspect, the first possible implementation manner of the second aspect, the second possible implementation manner of the second aspect, or the third possible implementation manner of the second aspect, in a fifth possible implementation manner, after the receiving, by an MSC, a first handover request message sent by an MME, the method further includes:

sending, by the MSC, a third handover request message to the base station of the 3G network, where the third handover request message is used to request the base station of the 3G network to hand over the UE from the LTE network to the CS domain of the 3G network for the CSFB;

receiving, by the MSC, a third handover request acknowledgement message sent by the base station of the 3G network, where the third handover request acknowledgement message includes a radio access bearer RAB, and the RAB is a RAB whose domain identifier indicates a packet switched PS domain, or the RAB is a PS RAB; and sending, by the MSC, a first handover request response message to the MME, where the first handover request response message includes the RAB.

According to a third aspect, an emergency center selection method is disclosed, including:

receiving, by an evolved NodeB eNB located in a Long Term Evolution LTE network, a first notification message sent by a mobility management entity MME, where the first notification message is used to instruct the eNB to hand over user equipment UE from the LTE network to a 3G network for circuit switched fallback CSFB of an emergency call, and the first notification message carries an emergency call indication, which is used to indicate to the eNB that the CSFB is triggered by the emergency call; and sending, by the eNB, a handover required message to the MME, where the handover required message is used to request the MME to hand over the UE from the LTE network to a circuit switched CS domain of the 3G network, a packet switched PS domain of the 3G network, or a CS domain and a PS domain of the 3G network for the CSFB, the handover required message carries the emergency call indication, which is used to indicate that the handover required message is a handover request message corresponding to the emergency call, and the handover required message carries information about a cell of the 3G network, so that the MME sends the information about the cell of the 3G network to a mobile switching center MSC and selects an emergency center according to the information about the cell of the 3G network.

With reference to the third aspect, in a first possible implementation manner, after the sending, by the eNB, a handover required message to the MME, the method further includes:

receiving, by the eNB, a handover requirement response message sent by the MME, where the handover requirement response message includes information about a CS domain radio resource, and the information about the CS domain radio resource is used to hand over the UE from the LTE network to the CS domain of the 3G network; and sending, by the eNB, a handover command to the UE, where the handover command is used to instruct the UE to hand over from the LTE network to the CS domain of the 3G network, and the handover command includes the information about the CS domain radio resource.

With reference to the third aspect, in a second possible implementation manner, after the sending, by the eNB, a handover required message to the MME, the method further includes:

receiving, by the eNB, a handover requirement response message sent by the MME, where the handover requirement response message includes a packet switched PS domain radio access bearer RAB, and the PS domain RAB is used to hand over the UE from the LTE network to the PS domain of the 2G or 3G network for the CSFB; and sending, by the eNB, a handover command to the UE, where the handover command includes the PS domain RAB.

With reference to the third aspect, in a third possible implementation manner, the information about the cell of the 3G network includes an identity of the cell of the 3G.

According to a fourth aspect, a mobility management entity MME is disclosed, including:

a receiving unit, configured to receive a request message initiated by user equipment UE located in a Long Term Evolution LTE network, where the request message is used to request circuit switched fallback CSFB for an emergency call;

a generation unit, configured to generate a first notification message according to the request message received by the receiving unit, where the first notification message is used to instruct the eNB to hand over the UE from the LTE network to a 3G network for the CSFB, and the first notification message carries an emergency call indication, which is used to indicate to the eNB that the CSFB is triggered by the emergency call; and a sending unit, configured to send the first notification message to the evolved NodeB eNB; where:

the generation unit is further configured to generate a first handover request message, where the first handover request message carries the emergency call indication, which is used to instruct the MSC to hand over the UE from the LTE network to a circuit switched CS domain of the 3G network for the emergency call, and the first handover request message further carries information about a cell of the 3G network or information about a cell that is of the LTE network and on which the UE currently camps, so that the mobile switching center MSC selects an emergency center according to the information about the cell of the 3G network or the information about the cell of the LTE network; and the sending unit is further configured to send, to the MSC, the first handover request message generated by the generation unit.

With reference to the fourth aspect, in a first possible implementation manner, the receiving unit is further configured to receive a handover required message sent by the eNB, where the handover required message carries the emergency call indication, and the handover required message carries the information about the cell of the 3G network.

With reference to the fourth aspect, in a second possible implementation manner, the information about the cell of the 3G network includes an identity of the cell of the 3G and the information about the cell of the LTE network includes an identity of the cell of the LTE network.

With reference to the fourth aspect, in a third possible implementation manner, the receiving unit is further configured to: after the sending unit sends the first handover request message to the MSC, receive a first handover response message that is sent by the MSC in response to the first handover request message, where the first handover response message includes information about a CS domain radio resource that is allocated by a base station of the 3G network to the UE;

the generation unit is further configured to generate a handover requirement response message according to the first handover response message received by the receiving unit, where the handover requirement response message includes the information about the CS domain radio resource, and the information about the CS domain radio resource is used to hand over the UE from the LTE network to the CS domain of the 3G network for the CSFB; and a sending unit is further configured to send, to the eNB, the handover requirement response message generated by the generation unit.

With reference to the fourth aspect, in a fourth possible implementation manner, the generation unit is further configured to: after the sending unit sends the first handover request message to the MSC, generate a second handover request message, where the second handover request message is used to request the SGSN to hand over the UE from the LTE network to a packet switched PS domain of the 2G or 3G network for the CSFB;

the sending unit is further configured to send the second handover request message to the serving general packet radio service support node SGSN;

the receiving unit is further configured to receive a second handover request response message sent by the SGSN, where the second handover request response message includes a PS domain radio access bearer RAB, and the PS domain RAB is used to hand over the UE from the LTE network to the PS domain of the 2G or 3G network;

the generation unit is further configured to generate a handover requirement response message according to the second handover request response message received by the receiving unit, where the handover requirement response message includes the PS domain RAB, so that the eNB sends the PS domain RAB to the UE; and the sending unit is further configured to send the handover requirement response message to the eNB.

With reference to the fourth aspect, in a fifth possible implementation manner, the receiving unit is further configured to: after the sending unit sends the first handover request message to the MSC, receive a first handover request response message sent by the MSC, where the first handover request response message includes a radio access bearer RAB, and the RAB is a RAB whose domain identifier indicates a PS domain, or the RAB is a PS RAB;

the generation unit is further configured to generate a handover requirement response message according to the first handover request response message received by the receiving unit, where the handover requirement response message includes the RAB, so that the eNB sends the RAB to the UE; and the sending unit is further configured to send the handover requirement response message to the eNB.

According to a fifth aspect, a mobile switching center MSC is disclosed, including:

a receiving unit, configured to receive a first handover request message sent by a mobility management entity MME, where the first handover request message is used to request the MSC to hand over user equipment UE from a Long Term Evolution LTE network to a circuit switched CS domain of a 3G network for circuit switched fallback CSFB of an emergency call, the first handover request message carries an emergency call indication, which is used to instruct the MSC to hand over the UE from the LTE network to the CS domain of the 3G network for the emergency call, and the first handover request message further carries information about a cell of the 3G network or information about a cell that is of the LTE network and on which the UE currently camps; and a selection unit, configured to select an emergency center for the UE according to the information about the cell of the 3G network or the information about the cell of the LTE network that is carried in the first handover request message received by the receiving unit.

With reference to the fifth aspect, in a first possible implementation manner, the receiving unit is further configured to: before the selection unit selects the emergency center for the UE according to the information about the cell of the 3G network or the information about the cell of the LTE network that is carried in the first handover request message received by the receiving unit, receive a handover complete message sent by a base station of the 3G network, where the handover complete message is used to indicate that the UE has completed the handover from the LTE network to the CS domain of the 3G network; and the receiving unit is further configured to receive an emergency call connection request message sent by the UE.

With reference to the second aspect or the first possible implementation manner of the second aspect, in a second possible implementation manner, the selection unit is specifically configured to query a domain name server, so as to select, for the UE, the emergency center corresponding to the information about the cell of the 3G network or the information about the cell of the LTE network.

With reference to the second aspect, or the first or the second possible implementation manner of the second aspect, in a third possible implementation manner, the information about the cell of the 3G network includes an identity of the cell of the 3G and the information about the cell of the LTE network includes an identity of the cell of the LTE network.

With reference to the second aspect, the first possible implementation manner of the second aspect, the second possible implementation manner of the second aspect, or the third possible implementation manner of the second aspect, in a fourth possible implementation manner, the MSC further includes a generation unit and a sending unit; where:

the generation unit is configured to generate a third handover request message, where the third handover request message is used to request the base station of the 3G network to allocate a CS domain resource to the UE for the handover to the CS domain of the 3G network;

the sending unit is further configured to send the third handover request message to the base station of the 3G network;

the receiving unit is further configured to receive a third handover request response message sent by the base station of the 3G network, where the third handover request response message includes information about the CS domain radio resource that is allocated by the base station of the 3G network to the UE for the handover to the CS domain of the 3G network;

the generation unit is further configured to generate a first handover response message, where the first handover response message includes the information about the CS domain radio resource; and the sending unit is further configured to send the first handover response message to the MME.

With reference to the second aspect, the first possible implementation manner of the second aspect, the second possible implementation manner of the second aspect, or the third possible implementation manner of the second aspect, in a fifth possible implementation manner, the generation unit is further configured to generate a third handover request message, where the third handover request message is used to request the base station of the 3G network to hand over the UE from the LTE network to the CS domain of the 3G network for the CSFB;

the sending unit is further configured to send the third handover request message to the base station of the 3G network;

the receiving unit is further configured to receive a third handover request acknowledgement message sent by the base station of the 3G network, where the third handover request acknowledgement message includes a radio access bearer RAB, and the RAB is a RAB whose domain identifier indicates a packet switched PS domain, or the RAB is a PS RAB;

the generation unit is further configured to generate a first handover request response message, where the first handover request response message includes the RAB; and the sending unit is further configured to send the first handover request response message to the MME.

According to a sixth aspect, an evolved NodeB eNB is disclosed, including:

a receiving unit, configured to receive a first notification message sent by a mobility management entity MME, where the first notification message is used to instruct the eNB to hand over user equipment UE from the LTE network to a 3G network for circuit switched fallback CSFB of an emergency call, and the first notification message carries an emergency call indication, which is used to indicate to the eNB that the CSFB is triggered by the emergency call;

a generation unit, configured to generate a handover required message according to the first notification message received by the receiving unit, where the handover required message is used to request the MME to hand over the UE from the LTE network to a circuit switched CS domain of the 3G network, a packet switched PS domain of the 3G network, or a CS domain and a PS domain of the 3G network for the CSFB, the handover required message carries the emergency call indication, which is used to indicate that the handover required message is a handover request message corresponding to the emergency call, and the handover required message carries information about a cell of the 3G network, so that the MME sends the information about the cell of the 3G network to a mobile switching center MSC and selects an emergency center according to the information about the cell of the 3G network; and a sending unit, configured to send the handover required message to the MME.

With reference to the sixth aspect, in a first possible implementation manner, the receiving unit is further configured to: after the sending unit sends the handover required message to the MME, receive a handover requirement response message sent by the MME, where the handover requirement response message includes information about a CS domain radio resource, and the information about the CS domain radio resource is used to hand over the UE from the LTE network to the CS domain of the 3G network;

the generation unit is further configured to generate a handover command, where the handover command is used to instruct the UE to hand over from the LTE network to the CS domain of the 3G network, and the handover command includes the information about the CS domain radio resource; and the sending unit is further configured to send the handover command to the UE.

With reference to the sixth aspect, in a second possible implementation manner, the receiving unit is further configured to: after the sending unit sends the handover required message to the MME, receive a handover requirement response message sent by the MME, where the handover requirement response message includes a packet switched PS domain radio access bearer RAB, and the PS domain RAB is used to hand over the UE from the LTE network to the PS domain of the 2G or 3G network for the CSFB;

the generation unit is further configured to generate a handover command, where the handover command includes the PS domain RAB; and the sending unit is further configured to send the handover command to the UE.

With reference to the sixth aspect, in a third possible implementation manner, the information about the cell of the 3G network includes an identity of the cell of the 3G.

According to a seventh aspect, an emergency center selection system is disclosed, including a mobility management entity, a mobile switching center, an evolved NodeB, a base station of a 3G network, and user equipment, where the mobility management entity is the mobility management entity according to the foregoing technical solution;

the evolved NodeB is the mobile switching center according to the foregoing technical solution; and the mobile switching center is the evolved NodeB according to the foregoing technical solution.

According to the emergency center selection method, device, and system that are provided in the embodiments of the present application, when handover from LTE to a 3G network is performed for SRVCC-based CSFB, information about a cell is added to an emergency call indication carried in a first handover request message sent by an MME, and an MSC selects an emergency center according to the cell information carried in the first handover request message. In the prior art, the emergency center is selected according to an RNC ID with relatively coarse granularity, and a time of an emergency call is relatively long. By contrast, according to the method, the device, and the system that are provided in the present application, the MSC can quickly select an appropriate emergency center according to the information about the cell, and further quickly set up an emergency call, which shortens a time of an emergency call and improves user experience.

DESCRIPTION OF EMBODIMENTS

In an emergency center selection method provided in an embodiment of the present application, in a process of triggering SRVCC-based emergency CSFB, a network is triggered to hand over from an LTE network to a 3G network, and user equipment adds cell information of a cell in which a user is located to an emergency call indication carried in a first handover request message sent by an MME, so that an MSC can quickly select an appropriate emergency center, which shortens duration of an emergency voice call and improves user experience. Embodiments of the present application further provide a corresponding device and system. Detailed descriptions are separately given below.

The following clearly and completely describes the technical solutions in the embodiments of the present application with reference to the accompanying drawings in the embodiments of the present application. Apparently, the described embodiments are merely some but not all of the embodiments of the present application. All other embodiments obtained by persons skilled in the art based on the embodiments of the present application without creative efforts shall fall within the protection scope of the present application.

Acronyms and abbreviations of some communications terms that are involved in the embodiments of the present application include: mobility management entity (MME), evolved NodeB (eNB), user equipment (UE), mobile switching center (MSC), the 2nd generation or 3rd generation mobile communications technologies (2G or 3G), and base station (BS), Long Term Evolution (LTE), serving GPRS support node (SGSN), circuit switched fallback (CSFB), terrestrial radio access network (UTRAN), Global System for Mobile communications (GGSM), enhanced data rate for GSM evolution (EDGE), and Global System for Mobile communications/enhanced data rate for GSM evolution radio access network (GERAN), where a base station in the embodiments of the present application includes a base station controller (BSC) and a radio network controller (RNC).

"First", "second", "third", "fourth", and the like, in the embodiments of the present application are only used for distinguishing different indication information instead of representing an order relationship.

Embodiment 1

Figure 1:
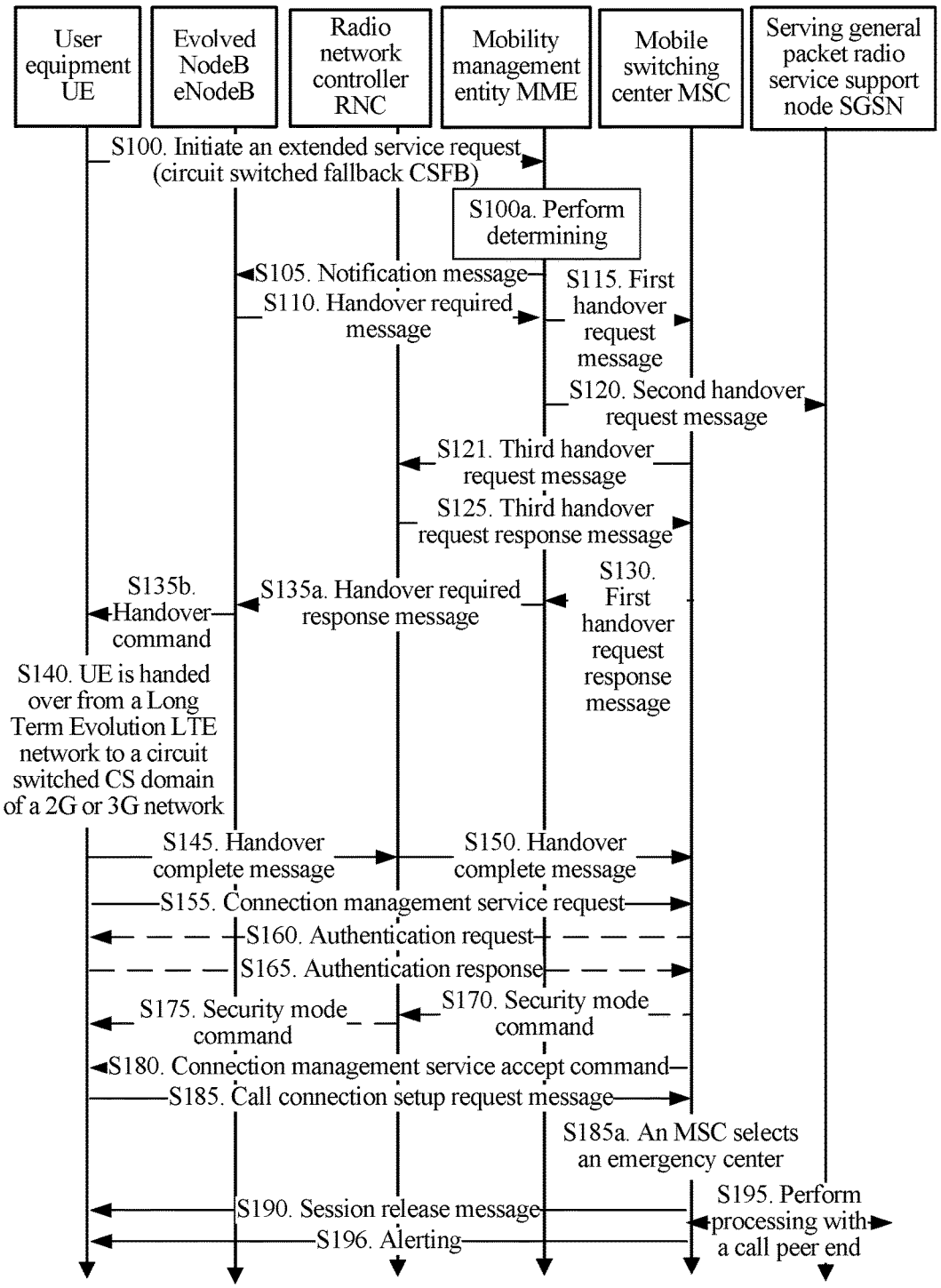
FIG. 1 is a schematic flowchart of an emergency center selection method according to Embodiment 1 of the present application.

Referring to FIG. 1, FIG. 1 is a fallback process implemented by handing over UE from an LTE network to a 3G network and an active call process after the handover according to an embodiment of the present application.

S100. UE sends an extended service request to an MME, where the extended service request is used to request circuit switched fallback CSFB. The extended service request is used to inform the MME that the circuit switched fallback CSFB is triggered for an emergency call.

S100a. The MME may determine whether the LTE network and the 3G network support handover of the UE from the LTE network to a CS domain of the 3G network for the CSFB.

Alternatively, the MME may not perform determining, but deems by default that a communications network supports the handover of the UE from the LTE network to the CS domain of the 3G network for the CSFB, or may perform determining only on some networks. The communications network is the LTE network and the 3G network.

S105. The MME sends a notification message to an evolved NodeB eNB according to the extended service request, where the notification message is used to instruct the eNB to hand over the UE from the LTE network to the CS domain of the 3G network for the CSFB, that is, the notification message is used to notify the eNB that the UE should be handed over to the 3G network for the CSFB. Further, the MME includes an emergency call indication in the notification message, so as to notify the eNB that the UE is handed over from the LTE network to the CS domain of the 3G network for the emergency call.

When the MME determines that the LTE network and the 3G network support the handover of the UE from the LTE network to the CS domain of the 3G network for the CSFB, the MME may send the notification message to inform the eNB whether the LTE network and the 3G network support the handover of the UE from the LTE network to the CS domain of the 3G network for the CSFB, so that the eNB initiates a handover requirement of handing over the UE from the LTE network to the CS domain of the 3G network for the CSFB. S110. The eNB sends a handover required message to the MME.

The handover required message may be a message (for example, an LTE to 3G PS HO Required message) for requiring handover from the LTE network to a packet switched PS domain of the 3G network, a message (for example, an LTE to 3G SRVCC HO Required message) for requiring the handover from the LTE network to the CS domain of the 3G network, or a message (for example, an LTE to 3G SRVCC and PS HO Required message) for requiring handover from the LTE network to the PS domain and the CS domain of the 3G network.

The handover required message may include UE capability information, which is used to indicate information about a frequency band supported by the UE, an access capability, and the like. For example, the UE capability information may be at least one of a classmark 2 (classmark2) and a classmark 3 (classmark3). In the prior art, when the UE does not support the handover from the LTE network to the CS of the 2G/3G network, the eNB does not send the UE capability information to the MME, and therefore the MME does not have the UE capability information. However, after the MME acquires the UE capability information, the MME may send the UE capability information to an MSC, so that the MSC can perform handover to the CS of the 2G/3G In this embodiment of the present application, the UE capability information may be transmitted to the MME by using a handover request message. The handover required message sent by the eNB carries the emergency call indication, where the emergency call indication is used to instruct the MME to hand over the UE from the LTE network to the CS domain of the 3G network for the emergency call.

The handover required message sent by the eNB further carries information about a cell of the 3G network, so that the MME learns information about a cell of the CS domain of the 3G network to which the UE is handed over from the LTE network.

S115. The MME sends a first handover request message to an MSC, where the first handover request message carries the emergency call indication, which is used to instruct the MSC to hand over the UE from the LTE network to the CS domain of the 3G network for the emergency call, and the first handover request message further carries information about a cell of the 3G network or information about a cell that is of the LTE network and on which the UE currently camps, so that the MSC selects an emergency center according to the information about the cell of the 3G network or the information about the cell of the LTE network.

Because the first handover request message is sent by the MME to the MSC, handover required by the first handover request message is the handover from the LTE network to the CS domain of the 3G network, that is, the first handover request is a PS-to-CS handover request.

After the MME receives the UE capability information from the eNB, the first handover request message may carry the UE capability information; for example, the capability information is at least one of a classmark classmark2 and a classmark classmark3.

Herein, the first handover request message sent by the MME to the MSC carries the emergency call indication, which is used to instruct the MSC to hand over the UE from the LTE network to the CS domain of the 3G network for the emergency call.

The first handover request message further carries the information about the cell of the 3G network, so that the MSC selects the emergency center according to the information about the cell of the 3G network; or the first handover request message carries the information about the cell that is of the LTE network and on which the UE currently camps, so that the MSC selects the emergency center according to the information about the cell of the LTE network.

S120. The MME sends a second handover request message to an SGSN, where the second handover request message is used to request the SGSN to initiate handover from the LTE network to a packet switched PS domain of the 3G network.

When being handed over from the LTE network to the CS domain, the UE may be handed over to the PS domain at the same time, or may be handed over to the PS domain at a different time. In this way, dependence of this solution on a network may be reduced, that is, an operator is required to support only the handover from the LTE to the CS domain of the 3G network, and there is no need to force the operator to support the handover from the LTE to the PS domain of the 3G network.

S121. The MSC sends a third handover request message to a base station, where the third handover request message is used to request the base station to allocate a CS domain resource to the UE for the handover to the CS domain of the 3G network.

The third handover request message is further used to request the base station to hand over the user equipment UE from the Long Term Evolution LTE network to the circuit switched CS domain of the 3G network for the CSFB. The base station allocates the CS domain resource to the UE for the handover from the LTE network to the CS domain of the 3G network. For example, the CS domain resource that is allocated by the base station includes a wired communications resource between the base station and the MSC and a radio resource between the base station and the UE.

S125. The base station sends a third handover request response message to the MSC, where the third handover request response message includes information about the CS domain radio resource, and the information about the CS domain radio resource is used to hand over the UE from the LTE network to the CS domain of the 3G network.

S130. The MSC sends a first handover response message to the MME, where the first handover response message includes the information about the CS domain radio resource.

S135a. The MME sends a handover requirement response message to the eNB, where the handover requirement response message includes the information about the CS domain radio resource.

S135b. The eNB sends a handover command to the UE, where the handover command includes the information about the CS domain radio resource.

S140. The UE is handed over from the LTE network to the CS domain of the 3G network according to the handover command.

The UE is handed over from the LTE network to the CS domain of the 3G network for the CSFB by using the information about the resource that is included in the handover command.

The UE generates a third session in a process of handover from the LTE network to the CS domain of the 3G network. Alternatively, the UE may not generate a session in the process of the handover from the LTE network to the CS domain of the 3G network.

S145. After the handover is completed, the UE sends a handover complete (HO Complete) message to the base station (BSC or RNC).

After receiving the handover complete message, to respond to the handover complete message, the base station needs to include a location area identity (LAI) in UTRAN mobility information sent to the UE, which, in this embodiment, may cause the UE to initiate location update (LAU), thereby leading to a failure in setting up a CS call. To avoid the failure, the UTRAN mobility information sent by the base station to the UE may not carry the location area identity.

The base station may send the LAI to the UE in a subsequent process of sending the UTRAN mobility information. Alternatively, when the UE sends an LAU message to the base station, to avoid a failure, the base station does not send the location update request message to the MSC, but the base station directly sends a location update accept message to the UE.

S150. The base station forwards the handover complete message in step S145 to the MSC.

S155. The UE sends a connection management service request (CM Service Request) to the MSC.

S160. The MSC sends an authentication request (Authenticate Request) to the UE.

Alternatively, step S160 may be skipped, that is, the MSC does not send the authentication request message to the UE.

S165. The UE sends an authentication response (Authenticate Response) to the MSC.

S170. The MSC sends a security mode command (Security mode command) to the base station, where the security mode command carries integrity protection information (Integrity Protection Information) and/or encryption information (Encryption Information), so that the base station sends the security mode command to the UE.

Alternatively, step S170 may be skipped, that is, the MSC does not send the security mode command to the base station.

S175. The base station sends the security mode command to the UE. Specifically, the base station executes this step according to the security mode command in step S170, or the base station executes this step after receiving the message in S145.

S180. Optionally, the MSC sends a connection management service accept command (CM service Accept) to the UE.

S185. The UE sends a call connection setup request message (Setup) to the MSC, where the call connection setup request message is used to request the MSC to generate a session for the CSFB of the emergency call. Alternatively, the call connection setup request message is used to request the MSC to generate the third session for the CSFB.

S185a. The MSC selects the emergency center according to the information about the cell of the 3G network or the information about the cell of the LTE network that is carried in the first handover request message.

Herein, the MSC can quickly select an appropriate emergency center according to the cell information carried in the first handover request message sent by the MME, and further quickly set up a call connection between the UE and the emergency center.

S190. After receiving the first CS call connection setup request message, if the first CS call connection setup request message is used to request the MSC to generate a first session for the CSFB of the emergency call, the MSC sends a first session release message to the UE, where the first session release message is used to request the UE to release the third session generated by the UE in a process of handover from the LTE network to the CS domain of the 3G network.

If the first CS call connection setup request message is used to request the MSC to generate the third session for the CSFB, the MSC does not need to send the first session release message to the UE.

S195. The MSC performs processing with a call peer end.

S196. The MSC sends an alerting (Alerting) message to the UE. The UE waits for an answer message from a peer end.

Further, a called party hooks off to enter a talk state.

When the call ends, because the call is triggered by the CSFB, the UE needs to be handed over to the LTE network after the call is completed. According to the third handover request message, the base station determines that the call is triggered by the CSFB. Therefore, after the base station of the 2G/3G network receives a call release message sent by the MSC, the base station of the 2G/3G network redirects the UE to the LTE network or the base station hands over the UE to the LTE network, where the call release message is a release command Iu Release Command or a clear command Clear Command.

In FIG. 1, in a process of implementing the circuit switched fallback, the handover from the LTE network to the 3G network is triggered, and the UE can be directly handed over from the LTE network to the CS domain of the 3G network. Therefore, a resource is allocated on a network side to the UE for the handover from the LTE to the CS domain of the 3G network, which avoids allocation of a CS domain resource for CSFB after the UE is handed over from the LTE network to the PS domain of the 3G network or is redirected to the 3G network, thereby reducing an access delay of accessing the CS domain of the 3G network by the UE.

According to the emergency center selection method provided in the present application, when a process of circuit switched fallback triggered by an emergency call is implemented, handover from an LTE network to a 3G network is triggered, and after UE is directly handed over from the LTE network to a CS domain of the 3G network, an MSC may select an emergency center according to cell information carried in a message sent by an MME. In the prior art, the MSC selects the emergency center by using an RNCID of a large range, and cannot quickly select an appropriate emergency center. By contrast, in the present application, the MSC can quickly select an appropriate emergency center according to the information about the cell, and quickly set up a call connection between the UE and the emergency center, which shortens call duration of an emergency call and improves user experience.

Embodiment 2

Figure 2A:
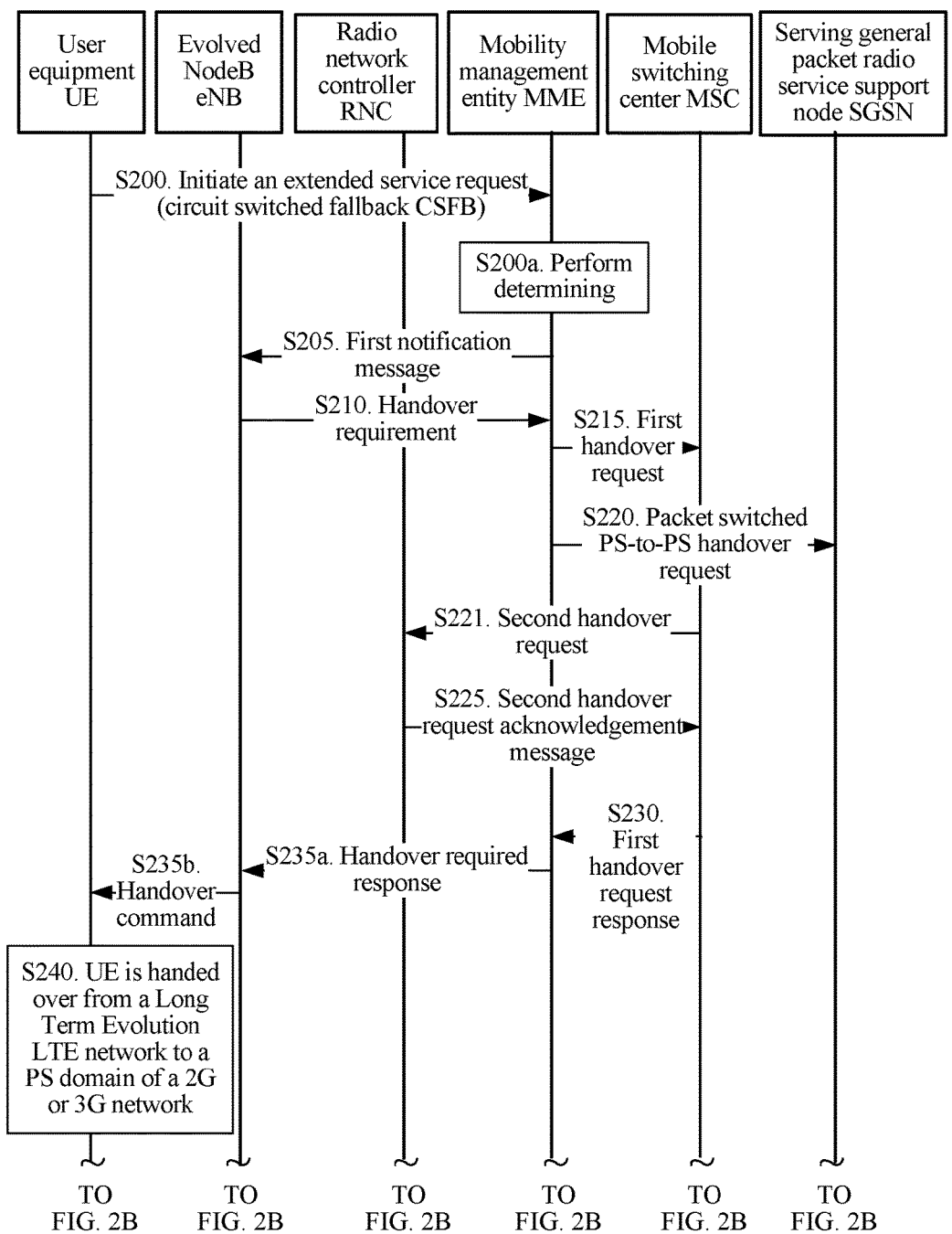
FIG. 2A and FIG. 2B are a schematic flowchart of an emergency center selection method according to Embodiment 2 of the present application.
Figure 2B:
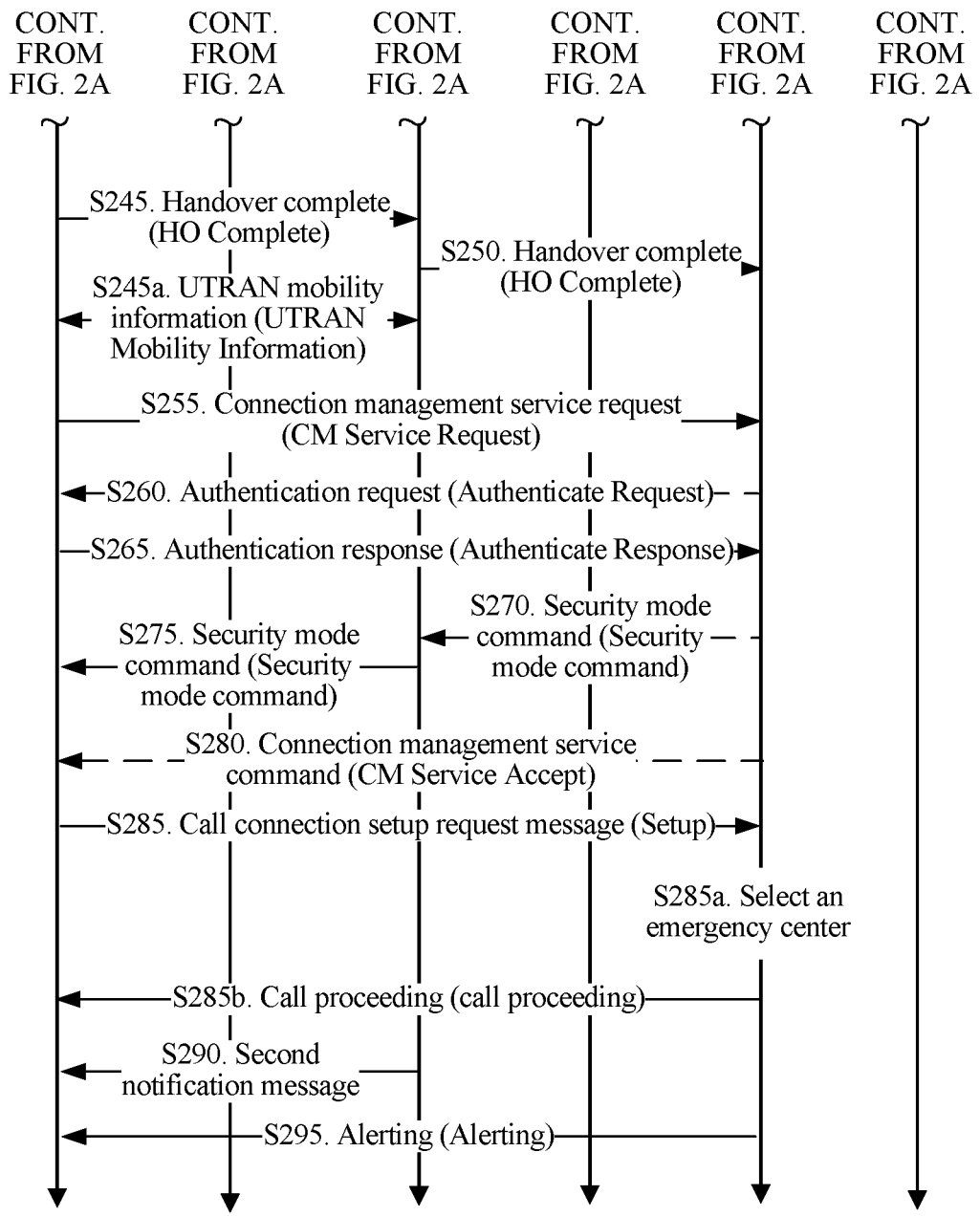

Referring to FIG. 2A and FIG. 2B, FIG. 2A and FIG. 2B are a fallback process implemented by handing over UE from an LTE network to a 3G network and an active call process after the handover according to an embodiment of the present application.

S200. UE sends an extended service request to an MME, where the extended service request is used to request circuit switched fallback CSFB. The extended service request is used to inform the MME that the circuit switched fallback CSFB is triggered for an emergency call.

S200a. The MME may determine whether the LTE network and the 2/3G network support handover of the UE from the LTE network to a CS domain of the 3G network for the CSFB.

Alternatively, the MME may not perform determining, but deems by default that a communications network supports the handover of the UE from the LTE network to the CS domain of the 3G network for the CSFB, or may perform determining only on some networks.

S205. The MME sends a first notification message to an evolved NodeB eNB according to the extended service request, where the first notification message is used to instruct the evolved NodeB eNB to hand over the UE from the LTE network to the 3G network for the CSFB. That is, the first notification message is used to notify the eNB that the UE should be handed over to the 3G network for the CSFB. The notification message sent by the MME carries an emergency call indication, which is used to instruct the eNB to hand over the UE from the LTE network to the CS domain of the 3G network for the CSFB of the emergency call.

When the MME determines that the LTE network and the 2G/3G network support the handover of the UE from the LTE network to the CS domain of the 3G network for the CSFB, the MME may send the first notification message to inform the eNB whether the LTE network and the 3G network support the handover of the UE from the LTE network to the CS domain of the 3G network for the CSFB, so that the eNB initiates a handover requirement of handing over the UE from the LTE network to the CS domain of the 3G network for the CSFB.

S210. The eNB sends a handover required message to the MME, where the handover required message carries the emergency call indication and information about a cell of the 3G network.

The handover required message may be a message for requiring handover from the LTE network to a PS domain of the 3G network, a message for requiring handover from the LTE network to the CS domain of the 2G/3G network, or a message for requiring handover from the LTE network to a PS domain and the CS domain of the 2G/3G network.

The handover required message may include UE capability information, which is used to indicate information about a frequency band supported by the UE, an access capability, and the like. For example, the UE capability information may be at least one of a classmark 2 (classmark2) and a classmark 3 (classmark3). In the prior art, when the UE does not support the handover from the LTE network to the CS of the 3G network, the eNB does not send the UE capability information to the MME, and therefore the MME does not have the UE capability information; however, the MME needs to send the UE capability information to an MSC, so that the MSC can perform handover to the CS of the 3G network. After acquiring the UE capability information, the MME may send the UE capability information to the MSC. In this embodiment of the present application, the UE capability information may be transmitted to the MME by using a handover request message.

The handover required message sent by the eNB carries the emergency call indication, where the emergency call indication is used to instruct the MME to hand over the UE from the LTE network to the CS domain of the 3G network for the emergency call.

The handover required message further carries the information about the cell of the 3G network, so that after receiving the handover required message, the MME can learn information about a cell in the CS domain of the 3G network to which the UE is handed over from the LTE network.

S215. The MME sends a first handover request message to an MSC, where the first handover request message carries the emergency call indication, and the first handover request message further carries the information about the cell of the 3G network or information about a cell that is of the LTE network and on which the UE currently camps.

Because the first handover request message is sent by the MME to the MSC, handover required by the first handover request message is the handover from the LTE network to the CS domain of the 3G network, that is, the first handover request is a PS-to-CS handover request.

After receiving the first handover request message, the MSC may prepare a CS voice resource and send a second handover request message, so as to instruct a base station of the 3G network to prepare the CS voice resource.

The first handover request message may include first indication information, where the first indication information is used to request the MSC to hand over the UE from the Long Term Evolution LTE network to the circuit switched CS domain of the 3G network for the CSFB. That is, the first indication information is used to indicate that the first handover request is sent for the CSFB. The first indication information may further indicate that the UE supports the handover from the LTE network to the PS domain of the 3G network. Alternatively, the first handover request message may not indicate the CSFB. In this case, the MSC deems by default that the first handover request is sent for the CSFB.

After the MME receives the UE capability information from the eNB, the first handover request message may include the UE capability information, so that the MSC can perform handover to the CS of the 2G/3G For example, the capability information is at least one of a classmark classmark2 and a classmark classmark3. Because an STN-SR is used for voice handover between an IP multimedia subsystem and the circuit domain of the 3G and this embodiment of the present application relates to the circuit switched fallback, when the first handover request message includes the session transfer number-single radio (STN-SR), the MSC ignores the STN-SR number.

The first handover request message sent by the MME to the MSC carries the emergency call indication, which is used to instruct the MSC to hand over the UE from the LTE network to the CS domain of the 3G network for the emergency call.

The first handover request message further carries the information about the cell of the 3G network, so that the MSC selects an emergency center according to the information about the cell of the 3G network; or the first handover request message further carries the information about the cell that is of the LTE network and on which the UE currently camps, so that the MSC selects an emergency center according to the information about the cell of the LTE network.

S220. The MME sends a PS-to-PS handover request message to an SGSN, where the PS-to-PS handover request message is used to request the SGSN to initiate handover from the LTE network to a packet switched PS domain of the 3G network.

Step S220 is an optional step. When a network prepares to hand over the UE from the LTE network to the CS domain, the UE may be handed over to the PS domain, or may not be handed over to the PS domain.

S221. The MSC sends a second handover request message to a base station (BSC or RNC) of the 3G network, where the second handover request message is used to request the base station to hand over the UE from the LTE network to the CS domain of the 3G network.

S225. The base station sends a second handover request acknowledgement message to the MSC, where the second handover request acknowledgement message includes a radio access bearer RAB, and the UE is handed over, by using the RAB, from the LTE network to the PS domain of the 3G network for the CSFB.

For example, the RAB is a RAB whose domain identifier indicates a packet switched PS domain, or the RAB is a PS RAB. For example, the RAB is a RAB whose domain identifier indicates a packet switched PS domain, or the RAB may be a CS RAB. However, a domain identifier in the CS RAB is a packet switched domain. When the UE does not support the handover from the LTE network to the CS domain of the 3G network, the UE may use the RAB for the handover from the LTE network to the PS domain of the 3G network, which means that the UE at this time has been handed over to the 3G network and then the UE can initiate a CS call in the 3G network.

After receiving the second handover request message, the base station may generate a CS RAB. The CS RAB may be used for the CS call initiated after the UE falls back to the 3G network. However, the second handover request acknowledgement message may not include the CS RAB.

S230. The MSC sends a first handover request response message to the MME, where the first handover request response message includes the RAB.

S235a. The MME sends a handover requirement response to the eNB, where the handover requirement response includes the RAB.

S235b. The eNB sends a handover command to the UE, where the handover command includes the RAB.

Optionally, before the eNB sends the handover command to the UE, the eNB determines that the UE supports the handover from the LTE network to the PS domain of the 3G network.

S240. The UE is handed over from the LTE network to the PS domain of the 3G network for the CSFB according to the RAB included in the handover command.

S245. After the handover is completed, the UE sends a handover complete message (HO Complete) to the base station.

Optionally, after receiving the handover complete message, the base station may use the CS RAB generated in step S225. When no CS RAB is generated in step S225, the base station may set up a new CS RAB.

S245a. After receiving the handover complete message, to respond to the handover complete message, the base station needs to include a location area identity (LAI) in UTRAN mobility information sent to the UE, which, in this embodiment, may cause the UE to initiate location update (LAU), thereby leading to a failure in setting up a CS call. To avoid the failure, the UTRAN mobility information sent by the base station to the UE may not include the location area identity.

The base station may send the LAI to the UE in a subsequent process of sending the UTRAN mobility information. Alternatively, when the UE sends an LAU message to the base station, to avoid a failure, the base station does not send the location update request message to the MSC, but the base station directly sends a location update accept message to the UE.

S250. The base station forwards the handover complete message in step S245 to the MSC.

S255. The UE sends a connection management service request (CM Service Request) to the MSC.

S260. Optionally, the MSC sends an authentication request (Authenticate Request) to the UE.

S265. Optionally, the UE sends an authentication response (Authenticate Response) to the MSC.

S270. The MSC sends a security mode command (Security mode command) to the base station, where the security mode command carries integrity protection information (Integrity Protection Information) and/or encryption information (Encryption Information), so that the base station sends the security mode command to the UE.

Alternatively, step S270 may be skipped, that is, the MSC does not send the security mode command to the base station.

S275. The base station sends the security mode command to the UE. Specifically, the base station executes this step according to the security mode command in step S270, or the base station executes this step after receiving the message in S245.

S280. Optionally, the MSC sends a connection management service command to the UE.

S285. The UE sends a first CS call connection setup request message to the MSC, where the first CS call connection setup request message is used to request the MSC to generate a first session.

S285a. The MSC selects an emergency center according to the information about the cell of the 3G network or the information about the cell of the LTE network that is carried in the first handover request message.

S285b. The MSC sends a call proceeding (call proceeding) message to the UE.

S290. The base station sends a second notification message to the UE. The UE may send a second notification response message to the base station.

To match an existing processing process of the UE to a maximum degree, reduce an exception, and avoid a call failure, after the base station receives a call setup message sent by the UE or the call proceeding message sent by the MSC, the base station sends the second notification message to the UE, where the second notification message includes the CS RAB allocated by the base station to the UE, such as the CS RAB described in step S225 or the CS RAB described in step S245a. The second notification message may be a radio bearer setup message or a radio bearer reconfiguration message. The UE may use the CS RAB to perform a voice call.

Alternatively, the base station may send the second notification message after receiving a third notification message sent by the MSC. After receiving at least one of the following messages, the MSC sends the second notification message to the base station, where the second notification message is used to request the base station to allocate a CS domain resource to the UE.

The following messages include the handover complete message sent by the base station, a connection management service request message sent by the UE, and the first CS call connection request message sent by the UE.

S295. The MSC sends an alerting (Alerting) message to the UE. The UE waits for an answer message from a peer end.

After a called party hooks off, a calling party and the called party enter a talk state.

When the call ends, because the call is triggered by the CSFB, the UE needs to be handed over to the LTE network after the call is completed. The base station determines, according to the second handover request message, that the call is triggered by the CSFB. Therefore, after the base station of the 3G network receives a call release message sent by the MSC, the base station of the 3G network redirects the UE to the LTE network or the base station hands over the UE to the LTE network, where the call release message is a release command Iu Release Command or a clear command Clear Command.

According to the emergency center selection method provided in this embodiment of the present application, when UE located in an LTE network initiates an emergency call, after the UE is handed over from the LTE to a CS domain of a 3G network, an MSC may select an emergency center according to cell information carried in a message sent by an MME. In the prior art, the MSC selects the emergency center according to an RNC ID; because there are multiple emergency centers within a range of the RNC ID, the MSC cannot quickly select an appropriate emergency center. By contrast, in the present application, the MSC can quickly select an appropriate emergency center according to information about a cell of the 3G network or information about a cell of the LTE network that is carried in a first handover request message, and quickly set up an emergency call connection between the UE and the emergency center, which shortens duration for setting up an emergency call and improves user experience.

Embodiment 3

Figure 3A:
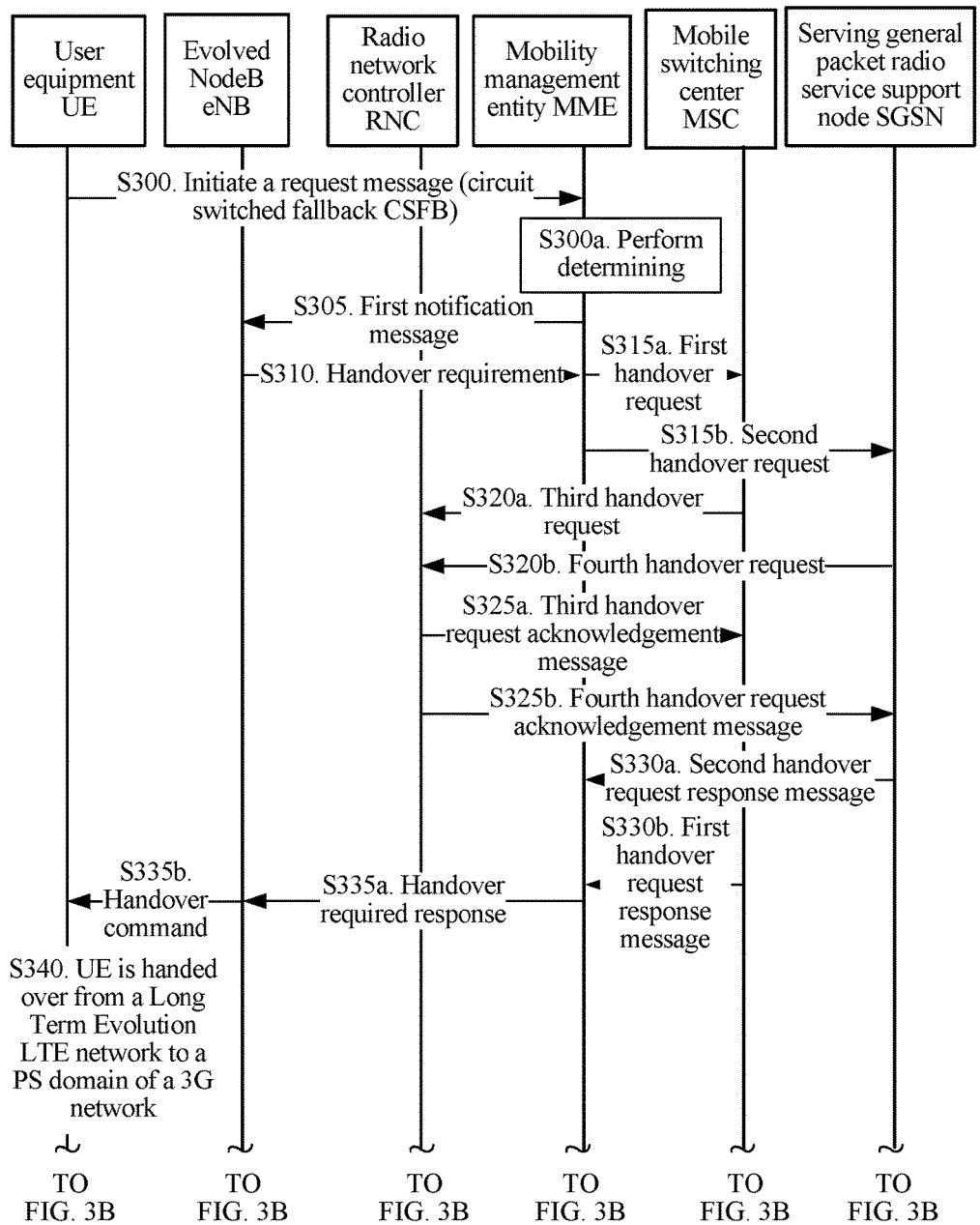
FIG. 3A and FIG. 3B are a schematic flowchart of an emergency center selection method according to Embodiment 3 of the present application.
Figure 3B:
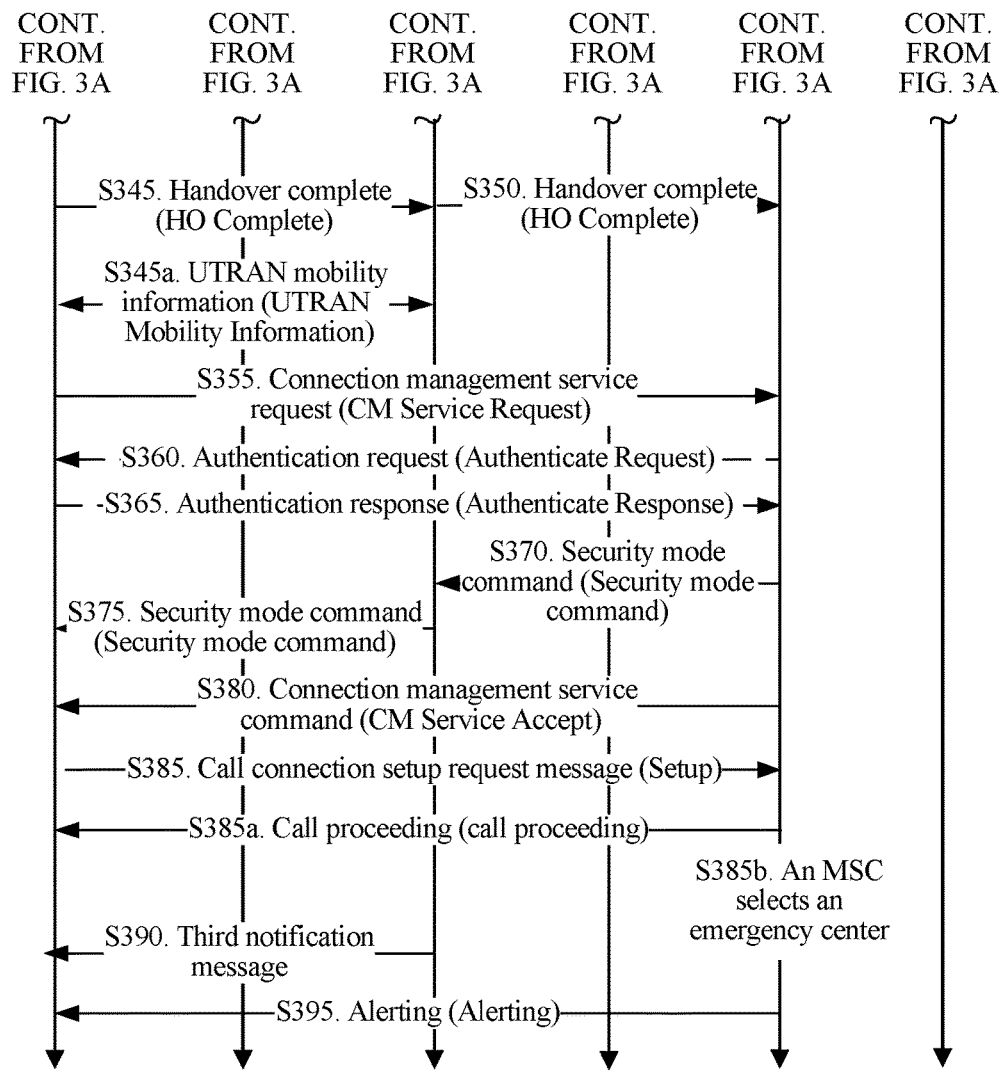

An embodiment of the present application provides an emergency center selection method. As shown in FIG. 3A and FIG. 3B, the method includes the following steps.

FIG. 3A and FIG. 3B show a network handover process and an active call process after network handover according to this embodiment of the present application.

S300. UE sends a request message to an MME, where the request message is used to request circuit switched fallback CSFB. For example, the request message is an extended service request message. The extended service request is used to inform the MME that the circuit switched fallback CSFB is triggered for an emergency call.

S300a. The MME may determine whether the LTE network and the 3G network support handover of the UE from the LTE network to a CS domain of the 3G network for the CSFB.

Alternatively, the MME may not perform determining, but deems by default that a communications network supports the handover of the UE from the LTE network to the CS domain of the 3G network for the CSFB, or may perform determining only on some networks.

S305. The MME sends a first notification message to an evolved NodeB eNB according to the request message, where the first notification message is used to instruct the eNB to hand over the UE from the LTE network to the 3G network for the CSFB, that is, the first notification message is used to notify the eNB that the UE should be handed over to the 3G network for the CSFB. Further, the MME includes an emergency call indication in the first notification message, so as to notify the eNB that the UE is handed over from the LTE network to the CS domain of the 3G network for the emergency call.

After the MME determines that the LTE network and the 3G network support the handover of the UE from the LTE network to the CS domain of the 3G network for the CSFB, the MME may send the first notification message to inform the eNB whether the LTE network and the 3G network support the handover of the UE from the LTE network to the circuit switched CS domain of the 3G network for the CSFB, so that the eNB initiates a handover requirement of handing over the UE from the LTE network to the circuit switched CS domain of the 3G network for the CSFB.

S310. The eNB sends a handover required message to the MME.

The handover required message may be a message for requiring handover from the LTE network to a PS domain of the 3G network, a message for requiring handover from the LTE network to the CS domain of the 3G network, or a message for requiring handover from the LTE network to a PS domain and the CS domain of the 3G network.

The handover required message may include UE capability information, which is used to indicate information about a frequency band supported by the UE, an access capability, and the like. For example, the UE capability information may be at least one of a classmark 2 (classmark2) and a classmark 3 (classmark3). In the prior art, when the UE does not support the handover from the LTE network to the CS of the 3G network, the eNB does not send the UE capability information to the MME, and therefore the MME does not have the UE capability information; however, the MME needs to send the UE capability information to an MSC, so that the MSC can perform handover to the CS of the 3G After acquiring the UE capability information, the MME may send the UE capability information to the MSC. In this embodiment of the present application, the UE capability information may be transmitted to the MME by using a handover request message.

The eNB includes the emergency call indication in the handover required message, so as to instruct the MME to hand over the UE from the LTE network to the CS domain of the 3G network for the emergency call.

Further, the eNB includes information about a cell of the 3G in the handover required message, so as to inform the MME of the information about the cell of the 3G in the handover required message; that is, the MME learns information about a cell of the CS domain of the 3G network to which the UE is handed over from the LTE network.

S315a. The MME sends a first handover request message to an MSC. Handover required by the first handover request message is the handover from the LTE network to the CS domain of the 3G network, that is, the first handover request is a PS-to-CS handover request.

After receiving the first handover request message, the MSC may prepare a CS voice resource and send a second handover request message, so as to instruct a base station of the 3G network to prepare the CS voice resource.

After the MME receives the UE capability information from the eNB, the first handover request message may include the UE capability information, so that the MSC can perform handover to the 3G CS. For example, the capability information is at least one of a classmark classmark2 and a classmark classmark3.

Because an STN-SR is used for voice handover between an IP multimedia subsystem and the circuit domain of the 3G and this embodiment of the present application relates to the circuit switched fallback, when the first handover request message includes the session transfer number-single radio (Session Transfer Number-Single Radio, STN-SR), the MSC ignores the STN-SR number.

The first handover request message sent by the MME to the MSC carries the emergency call indication, which is used to instruct the MSC to hand over the UE from the LTE network to the CS domain of the 3G network for the emergency call.

Further, the emergency call indication carried in the first handover request message carries the information about the cell of the 3G so that the MSC selects an emergency center according to the information about the cell of the 3G; or the emergency call indication carried in the first handover request message carries information about a cell that is of the LTE network and on which the UE currently camps, so that the MSC selects an emergency center according to the information about the cell of the LTE network.

S315b. The MME sends a second handover request message to an SGSN, where the second handover request message is used to request the SGSN to initiate handover from the LTE network to a packet switched PS domain of the 3G network.

S320a. The MSC sends a third handover request message to a base station of the 3G network, where the third handover request message is used to request the base station to hand over the UE from the LTE network to the CS domain of the 3G network.

S320b. The SGSN sends a fourth handover request message to the base station of the 3G network, where the fourth handover request message is used to request the base station to hand over the UE from the LTE network to the PS domain of the 3G network.

S325a. The base station sends a third handover request acknowledgement message to the MSC.

S325b. The base station sends a fourth handover request acknowledgement message to the SGSN, where the fourth handover request acknowledgement message includes a PS domain RAB, and the PS domain RAB is used to hand over the UE from the LTE network to the packet switched PS domain of the 3G network for the circuit switched fallback CSFB.

For example, the RAB is a RAB whose domain identifier indicates a packet switched domain, or the RAB is a PS RAB. For example, the RAB is a RAB whose domain identifier indicates a packet switched domain, or the RAB may be a CS RAB. However, a domain identifier in the CS RAB is a packet switched domain. When the UE does not support the handover from the LTE network to the CS domain of the 3G network, the UE may use the RAB for the handover from the LTE network to the PS domain of the 3G network, which means that the UE at this time has been handed over to the 3G network and then the UE can initiate a CS call in the 3G network.

After receiving the second handover request message, the base station may generate a CS RAB. The CS RAB may be used for the CS call initiated after the UE falls back to the 3G network. However, the second handover request acknowledgement message may not include the CS RAB.

After receiving the fourth handover request message, the base station may generate a CS RAB. The CS RAB may be used for the CS call initiated after the UE falls back to the CS domain. However, the fourth handover request acknowledgement message may not include the CS RAB.

Optionally, the base station may determine, according to a UE capability, that the UE supports the handover from the LTE to the PS domain of the 3G network. Therefore, the fourth handover request acknowledgement message includes a RAB used to hand over the UE from the LTE network to the PS domain of the 3G network for the CSFB. The base station may deem by default that the UE supports the handover to the PS domain, so that no determining is required.

Optionally, before the base station sends the fourth handover request acknowledgement message to the SGSN, the base station allocates the CS domain RAB, and the fourth handover request acknowledgement message does not include the CS domain RAB.

S330a. The SGSN sends a second handover request response message to the MME, where the second handover request response message includes a PS domain RAB, and the PS domain RAB is used to hand over the UE from the LTE network to the packet switched PS domain of the 3G network.

S330b. Optionally, the MSC sends a first handover request response message to the MME, and the MME ignores the first handover request response message.

Step S330b may be skipped, that is, the MSC does not send the first handover request response message to the MME.

S335a. The MME sends a handover requirement response to the eNB according to the second handover request response message.

S335b. The eNB sends a handover command to the UE, where the handover command includes a PS domain RAB, and the PS domain RAB is used to hand over the UE from the LTE network to the PS domain of the 3G network for the CSFB.

Optionally, before the eNB sends the handover command to the UE, the eNB determines that the UE supports the handover from the LTE network to the PS domain of the 3G network.

S340. The UE is handed over from the LTE network to the PS domain of the 3G network for the CSFB according to the PS domain RAB included in the handover command.

S345. After the handover is completed, the UE sends a handover complete message (HO Complete) to the base station (BSC or RNC).

S345a. Optionally, after receiving the handover complete message, the RNC releases the CS RAB generated in step S120a and sets up a new CS RAB. Furthermore, a bearer between the MSC and the RNC does not need to be modified and may be reused.

After receiving the handover complete message, to respond to the handover complete message, the base station needs to include a location area identity (LAI) in UTRAN mobility information sent to the UE, which, in this embodiment, may cause the UE to initiate location update (LAU), thereby leading to a failure in setting up the CS call. To avoid the failure, the UTRAN mobility information sent by the base station to the UE may not include the location area identity.

The RNC may send the LAI to the UE in a subsequent process of sending the UTRAN mobility information. Alternatively, when the UE sends an LAU message to the base station of the 3G network, to avoid a failure, the base station of the 3G network does not send the location update request message to the MSC, but the base station of the 3G network sends a location update accept message to the UE.

S350. The base station (BSC or RNC) forwards the handover complete message in step S345 to the MSC.

After the base station receives a signaling message sent by the UE to the MSC, the base station of the 3G network sends the signaling message to the MSC by means of a connection that is set up in a process of the handover from the LTE network to the circuit switched CS domain of the 3G network.

Alternatively, the base station sends the signaling message to the MSC by using a direct transmission message.

S355. The UE sends a connection management service request (CM Service Request) to the MSC.

S360. Optionally, the MSC sends an authentication request (Authenticate Request) to the UE.

S365. Optionally, the UE sends an authentication response (Authenticate Response) to the MSC.

S370. The MSC sends a security mode command (Security mode command) to the base station, where the security mode command carries integrity protection information (Integrity Protection Information) and/or encryption information (Encryption Information), so that the base station sends the security mode command to the UE.

Alternatively, step S370 may be skipped, that is, the MSC does not send the security mode command to the base station.

S375. The base station sends the security mode command to the UE. Specifically, the base station executes this step according to the security mode command in step S370, or the base station executes this step after receiving the message in S345.

S380. Optionally, the MSC sends a connection management service command to the UE.

S385. The UE sends a call connection setup request message to the MSC, where the call connection setup request message is used to request the MSC to set up an emergency call connection between the UE and the emergency center.

S385a. The MSC sends a call proceeding (call proceeding) message to the UE.

S385b. The MSC selects the emergency center according to information about a cell of the 3G carried in the first handover request message; or the MSC selects the emergency center according to information, carried in the first handover request message, about a cell that is of the LTE network and on which the UE currently camps.

Specifically, the MSC queries, according to the information about the cell of the 3G network or the information about the cell of the LTE network, a domain name server, so as to select the emergency center.

S390. The base station sends a third notification message to the UE. The UE may send a third notification response message to the base station.

To match an existing processing process of the UE to a maximum degree, reduce an exception, and avoid a call failure, after the base station receives a call setup message sent by the UE or the call proceeding message sent by the MSC, the base station sends the third notification message to the UE, where the third notification message includes the CS domain RAB allocated by the base station to the UE, such as the CS RAB described in step S325 or the CS RAB described in step S345a. The third notification message may be a radio bearer setup message or a radio bearer reconfiguration message. The UE may use the CS RAB to perform a voice call.

Alternatively, the base station may send the third notification message after receiving a second notification message sent by the MSC. After receiving at least one of the following messages, the MSC sends the third notification message to the base station, where the third notification message is used to request the base station to allocate a CS domain resource to the UE.

The following messages include the handover complete message sent by the base station, a connection management service request message sent by the UE, and the call connection request message sent by the UE.

S395. The MSC sends an alerting (Alerting) message to the UE. The UE waits for an answer message from a peer end.

After a called party hooks off, a calling party and the called party enter a talk state.

When the call ends, because the call is triggered by the CSFB, the UE needs to be handed over to the LTE network after the call is completed. The base station determines, according to the second handover request message, that the call is triggered by the CSFB. Therefore, after the base station of the 3G network receives a call release message sent by the MSC, the base station of the 3G network redirects the UE to the LTE network or the base station hands over the UE to the LTE network, where the call release message is a release command Iu Release Command or a clear command Clear Command.

In FIG. 3A and FIG. 3B, for UE that supports only handover from an LTE network to a PS domain of a 3G network, in a process of implementing CSFB, a radio resource bearer for the handover from the LTE network to the PS domain of the 3G network is provided for the UE in a process of handover from the LTE network to a CS domain of the 3G network, so that the UE can be handed over to the PS domain of the 3G network by means of handover from the LTE network to the CS domain of the 3G network. After being handed over to the PS domain, the UE can perform a CS domain call. A network triggers the handover from the LTE network to the CS domain of the 3G network, so that the network can prepare a CS domain voice resource in advance and shorten duration of a voice call.

According to the emergency center selection method provided in this embodiment of the present application, when handover from LTE to a 3G network is performed for SRVCC-based CSFB, information about a cell is added to an emergency call indication carried in a first handover request message sent by an MME, and an MSC selects an emergency center according to the cell information carried in the first handover request message. In the prior art, the emergency center is selected according to an RNC ID with relatively coarse granularity, and a time of an emergency call is relatively long. By contrast, according to the method provided in the present application, the MSC can quickly select an appropriate emergency center according to the information about the cell, and further quickly set up an emergency call, which shortens a time of an emergency call and improves user experience.

Embodiment 4

Figure 4:
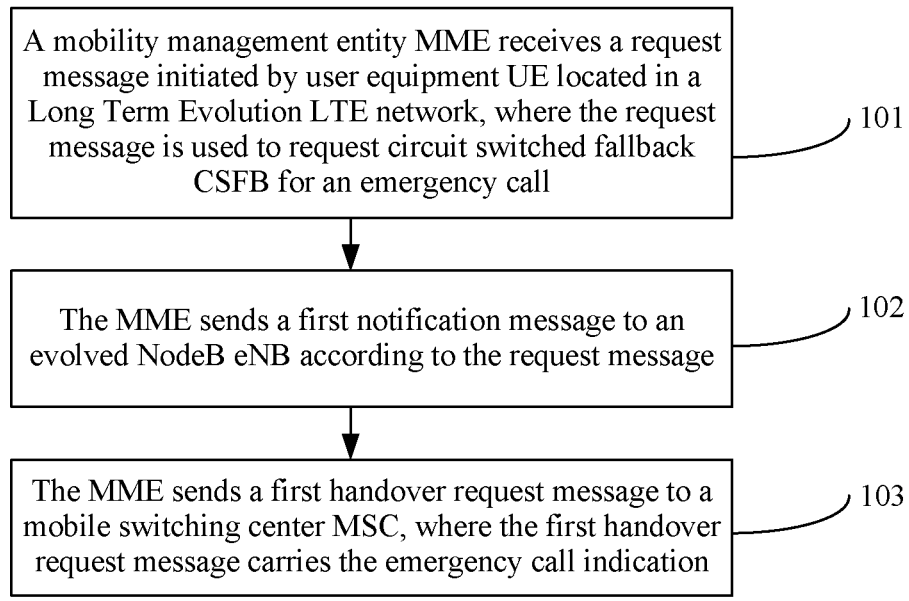
FIG. 4 is a schematic flowchart of an emergency center selection method according to Embodiment 4 of the present application.

An embodiment of the present application provides an emergency center selection method, which is executed by a mobility management entity MME. As shown in FIG. 4, the method includes the following steps:

101. A mobility management entity MME receives a request message initiated by user equipment UE located in a Long Term Evolution LTE network, where the request message is used to request circuit switched fallback CSFB for an emergency call.

The request message initiated by the user equipment UE located in the Long Term Evolution LTE network may be an extended service request message.

102. The MME sends a first notification message to an evolved NodeB eNB according to the request message.

The first notification message is used to instruct the eNB to hand over the UE from the LTE network to a 3G network for the CSFB, and the first notification message carries an emergency call indication, which is used to indicate to the eNB that the CSFB is triggered by the emergency call.

In addition, the first notification message includes indication information, where the indication information is used to indicate that the LTE network, the 3G network, and the UE support handover of the UE from the LTE network to a CS domain of the 3G network for the CSFB. The indication information is used to indicate that the LTE network, the 3G network, and the UE support single radio voice call continuity SRVCC handover.

103. The MME sends a first handover request message to a mobile switching center MSC, where the first handover request message carries the emergency call indication.

Herein, the emergency call indication carried in the first handover request message is used to instruct the MSC to hand over the UE from the LTE network to the circuit switched CS domain of the 3G network for the emergency call, and the first handover request message further carries information about a cell of the 3G network or information about a cell that is of the LTE network and on which the UE currently camps, so that the MSC selects an emergency center according to the information about the cell of the 3G network or the information about the cell of the LTE network.

After the MME sends the first handover request message to the MSC, the MME further receives a first handover response message that is sent by the MSC in response to the first handover request message, where the first handover response message includes information about a CS domain radio resource that is allocated by a base station of the 3G network to the UE; and the MME sends a handover requirement response message to the eNB, where the handover requirement response message includes the information about the CS domain radio resource, and the information about the CS domain radio resource is used to hand over the UE from the LTE network to the CS domain of the 3G network for the CSFB.

Alternatively, after the MME sends the first handover request message to the MSC, the MME further sends a second handover request message to a serving general packet radio service support node SGSN, where the second handover request message is used to request the SGSN to hand over the UE from the LTE network to a packet switched PS domain of the 3G network for the CSFB;

the MME receives a second handover request response message sent by the SGSN, where the second handover request response message includes a PS domain radio access bearer RAB, and the PS domain RAB is used to hand over the UE from the LTE network to the PS domain of the 2G or 3G network; and the MME sends a handover requirement response message to the eNB according to the second handover request response message, where the handover requirement response message includes the PS domain RAB, so that the eNB sends the PS domain RAB to the UE.

Alternatively, after the MME sends the first handover request message to the MSC, the MME further receives a first handover request response message sent by the MSC, where the first handover request response message includes a radio access bearer RAB, and the RAB is a RAB whose domain identifier indicates a PS domain, or the RAB is a PS RAB; and the MME sends a handover requirement response message to the eNB according to the first handover request response message, where the handover requirement response message includes the RAB, so that the eNB sends the RAB to the UE.

Before the MME sends the first handover request message to the mobile switching center MSC, the MME further receives a handover required message sent by the eNB, where the handover required message carries the emergency call indication.

The handover required message carries the emergency call indication, which is used to inform the MME that the handover required message is a handover required message corresponding to the emergency call. The handover required message is further used to indicate that the UE supports the handover from the LTE network to the CS domain of the 3G network.

Herein, the handover required message is a message for requiring handover from the LTE network to a packet switched PS domain of the 3G network, a message for requiring the handover from the LTE network to the CS domain of the 3G network, or a message for requiring handover from the LTE network to the PS domain and the CS domain of the 3G network.

Herein, the handover required message carries the information about the cell of the 3G network. In addition, the information about the cell of the 3G network includes an identity of the cell of the 3G; the information about the cell of the LTE network includes an identity of the cell of the LTE network.

For a detailed description of the foregoing processing steps and another processing step of the MME in this embodiment, reference may be made to the description in the embodiment corresponding to FIG. 1, FIG. 2A and FIG. 2B, or FIG. 3A and FIG. 3B, and details are not described herein again.

According to the emergency center selection method provided in this embodiment of the present application, when handover from LTE to a 3G network is performed for SRVCC-based CSFB, information about a cell is added to an emergency call indication carried in a first handover request message sent by an MME, and an MSC selects an emergency center according to the cell information carried in the first handover request message. In the prior art, the emergency center is selected according to an RNC ID with relatively coarse granularity, and a time of an emergency call is relatively long. By contrast, according to the method provided in the present application, the MSC can quickly select an appropriate emergency center according to the information about the cell, and further quickly set up an emergency call, which shortens a time of an emergency call and improves user experience.

Figure 5:
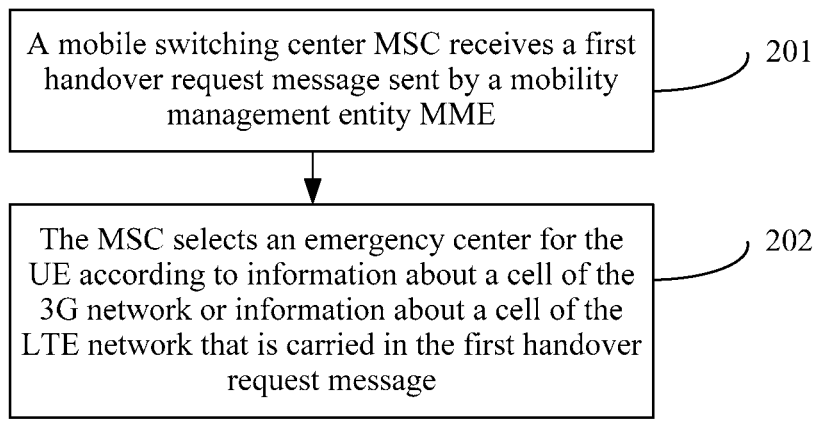
FIG. 5 is a schematic flowchart of another emergency center selection method according to Embodiment 4 of the present application.

An embodiment of the present application further provides an emergency center selection method, which is executed by a mobile switching center MSC. As shown in FIG. 5, the method includes the following steps:

201. A mobile switching center MSC receives a first handover request message sent by a mobility management entity MME.

The first handover request message is used to request the MSC to hand over user equipment UE from a Long Term Evolution LTE network to a circuit switched CS domain of a 3G network for circuit switched fallback CSFB of an emergency call, and the first handover request message carries an emergency call indication, which is used to instruct the MSC to hand over the UE from the LTE network to the CS domain of the 3G network for the emergency call.

The first handover request message further carries information about a cell of the 3G network or information about a cell that is of the LTE network and on which the UE currently camps, where the information about the cell of the 3G network includes an identity of the cell of the 3G, and the information about the cell of the LTE network includes an identity of the cell of the LTE network.

After the MSC receives the first handover request message sent by the MME, an implementation manner is: further sending, by the MSC, a third handover request message to a base station of the 3G network, where the third handover request message is used to request the base station of the 3G network to allocate a CS domain resource to the UE for the handover to the CS domain of the 3G network;

receiving, by the MSC, a third handover request response message sent by the base station of the 3G network, where the third handover request response message includes information about the CS domain radio resource that is allocated by the base station of the 3G network to the UE for the handover to the CS domain of the 3G network; and sending, by the MSC, a first handover response message to the MME, where the first handover response message includes the information about the CS domain radio resource.

Alternatively, in another implementation manner, after receiving the first handover request message sent by the MME, the MSC further sends a third handover request message to a base station of the 3G network, where the third handover request message is used to request the base station of the 3G network to hand over the UE from the LTE network to the CS domain of the 3G network for the CSFB;

the MSC receives a third handover request acknowledgement message sent by the base station of the 3G network, where the third handover request acknowledgement message includes a radio access bearer RAB, and the RAB is a RAB whose domain identifier indicates a packet switched PS domain, or the RAB is a PS RAB; and the MSC sends a first handover request response message to the MME, where the first handover request response message includes the RAB.

Certainly, alternatively, the RAB may be another RAB that can be used to hand over the UE from the LTE network to a PS domain of the 3G network. From a perspective of the UE, handover to the PS domain of the 3G network is determined according to the RAB, so that the UE is handed over to the 3G network and then a CS domain call may be processed.

202. The MSC selects an emergency center for the UE according to information about a cell of the 3G network or information about a cell of the LTE network that is carried in the first handover request message.

In specific implementation, that the MSC selects an emergency center for the UE according to the information about the cell of the 3G network or the information about the cell of the LTE network that is carried in the first handover request message is actually querying, by the MSC, a domain name server, so as to select, for the UE, the emergency center corresponding to the information about the cell of the 3G network or the information about the cell of the LTE network.

After receiving at least one of the following messages, the MSC sends a second notification message to the base station, where the second notification message is used to request the base station to allocate a CS domain resource to the UE.

The following messages include a handover complete message sent by the base station, a connection management service request message sent by the UE, the call connection request message sent by the UE, and a paging response message sent by the UE.

Herein, the MSC can quickly select an appropriate emergency center according to the information about the cell of the 3G network or the information about the cell of the LTE network that is carried in the first handover request message, and further set up a call connection between the UE and the emergency center, which shortens duration for setting up an emergency call.

Before the MSC selects the emergency center for the UE according to the information about the cell of the 3G network or the information about the cell of the LTE network that is carried in the first handover request message, the MSC further receives a handover complete message sent by the base station of the 3G network, where the handover complete message is used to indicate that the UE has completed the handover from the LTE network to the CS domain of the 3G network.

In addition, after the MSC further receives the handover complete message sent by the base station of the 3G network, the MSC receives an emergency call connection request message sent by the UE.

After receiving the emergency call connection request message sent by the UE, the MSC may set up an emergency call connection between the UE and the emergency center.

In an emergency call, the UE is a calling party. The call connection between the UE and the emergency center is denoted as a first session.

In the foregoing description, the MSC receives a first call connection setup request message sent by the UE, where the first call connection setup request message is used to request the MSC to generate a first session for the CSFB of the emergency call. This step is an active call process of the UE.

For a detailed description of the foregoing processing steps and another processing step of the MSC in this embodiment, reference may be made to the description in the embodiment corresponding to FIG. 1, FIG. 2A and FIG. 2B, or FIG. 3A and FIG. 3B, and details are not described herein again.

According to the emergency center selection method provided in this embodiment of the present application, when handover from LTE to a 3G network is performed for SRVCC-based CSFB, information about a cell is added to an emergency call indication carried in a first handover request message sent by an MME, and an MSC selects an emergency center according to the cell information carried in the first handover request message. In the prior art, the emergency center is selected according to an RNC ID with relatively coarse granularity, and a time of an emergency call is relatively long. By contrast, according to the method provided in the present application, the MSC can quickly select an appropriate emergency center according to the information about the cell, and further quickly set up an emergency call, which shortens a time of an emergency call and improves user experience.

Figure 6:
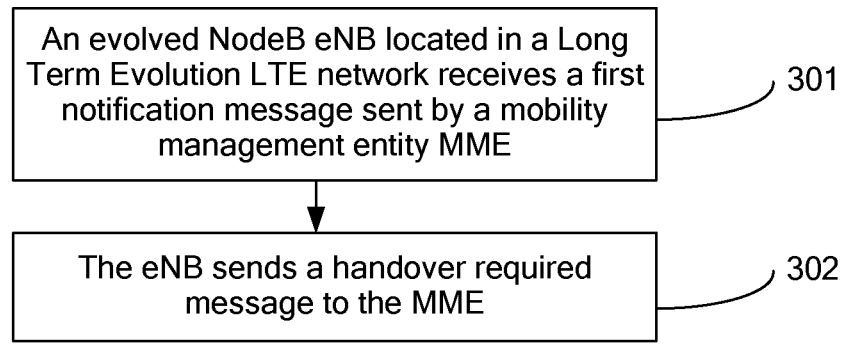
FIG. 6 is a schematic flowchart of another emergency center selection method according to Embodiment 4 of the present application.

An embodiment of the present application further provides an emergency center selection method, which is executed by an evolved NodeB. As shown in FIG. 6, the method includes the following steps:

301. An evolved NodeB eNB located in a Long Term Evolution LTE network receives a first notification message sent by a mobility management entity MME.

The first notification message is used to instruct the eNB to hand over user equipment UE from the LTE network to a 3G network for circuit switched fallback CSFB of an emergency call; the first notification message carries an emergency call indication, which is used to indicate to the eNB that the CSFB is triggered by the emergency call.

In addition, the notification message is further used to indicate that the LTE network, the 3G network, and the UE support handover of the UE from the LTE network to a CS domain of the 3G network for the CSFB.

302. The eNB sends a handover required message to the MME.

The handover required message is used to request the MME to hand over the UE from the LTE network to the circuit switched CS domain of the 3G network, a packet switched PS domain of the 3G network, or the CS domain and a PS domain of the 3G network for the CSFB; the handover required message carries the emergency call indication, which is used to indicate that the handover required message is a handover request message corresponding to the emergency call.

Information about a cell of the 3G network includes an identity of the cell of the 3G and the handover required message carries the information about the cell of the 3G network, so that the MME sends the information about the cell of the 3G network to a mobile switching center MSC and selects an emergency center according to the information about the cell of the 3G network.

It should be noted that the handover required message is a message for requiring the handover from the LTE network to the packet switched PS domain of the 3G network, a message for requiring the handover from the LTE network to the CS domain of the 3G network, or a message for requiring the handover from the LTE network to the PS domain and the CS domain of the 3G network.

In addition, the handover required message includes UE capability information, so that the MME includes the UE capability information in a first handover request message sent to the mobile switching center MSC.

After sending the handover required message to the MME, the eNB receives a handover requirement response message sent by the MME, where the handover requirement response message includes information about a CS domain radio resource, and the information about the CS domain radio resource is used to hand over the UE from the LTE network to the CS domain of the 3G network; and the eNB sends a handover command to the UE, where the handover command is used to instruct the UE to hand over from the LTE network to the CS domain of the 3G network, and the handover command includes the information about the CS domain radio resource.

Alternatively, after sending the handover required message to the MME, the eNB receives a handover requirement response message sent by the MME, where the handover requirement response message includes a packet switched PS domain radio access bearer RAB, and the PS domain RAB is used to hand over the UE from the LTE network to the PS domain of the 2G or 3G network for the CSFB; and the eNB sends a handover command to the UE, where the handover command includes the PS domain RAB.

In the foregoing description, the handover command is used to instruct the UE to hand over from the LTE network to the circuit switched CS domain of the 3G network for the CSFB. In addition, the eNB determines that the UE supports the handover from the LTE network to the CS domain of the 3G network.

The eNB determines that the UE supports the handover from the LTE network to the PS domain of the 3G network. The handover command is further used to instruct the UE to hand over from the LTE network to the PS domain of the 3G network, the handover command includes information about a PS domain resource of the 3G network, and the information about the PS domain resource of the 3G network is used to hand over the UE from the LTE network to the PS domain of the 3G network.

For a detailed description of the foregoing processing steps and another processing step of the eNB in this embodiment, reference may be made to the description in the embodiment corresponding to FIG. 1, FIG. 2A and FIG. 2B, or FIG. 3A and FIG. 3B, and details are not described herein again.

According to the emergency center selection method provided in this embodiment of the present application, when UE located in an LTE network initiates an emergency call, after the UE is handed over from the LTE to a CS domain of a 3G network, an MSC may select an emergency center according to cell information carried in a message sent by an MME. In the prior art, the MSC selects the emergency center according to an RNC ID; because there are multiple emergency centers within a range of the RNC ID, the MSC cannot quickly select an appropriate emergency center. By contrast, in the present application, the MSC can quickly select an appropriate emergency center according to information about a cell of the 3G network or information about a cell of the LTE network that is carried in a first handover request message, and quickly set up an emergency call connection between the UE and the emergency center, which shortens duration for setting up an emergency call and improves user experience.

Embodiment 5

Figure 7:
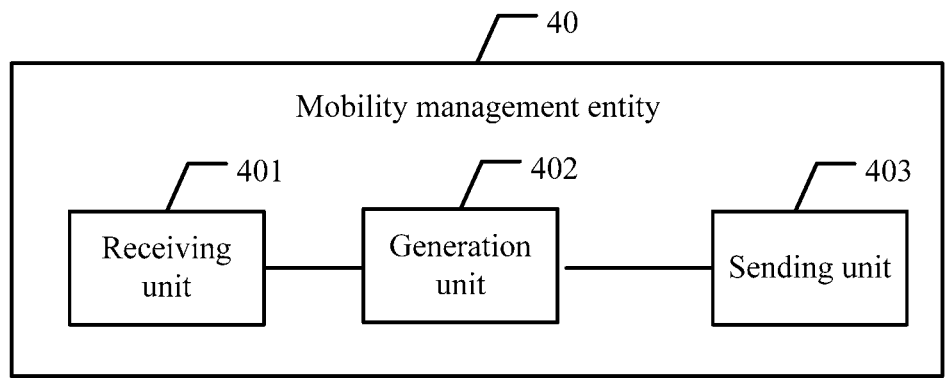
FIG. 7 is a structural block diagram of a mobility management entity MME according to Embodiment 5 of the present application.

Referring to FIG. 7, a mobility management entity MME 40 provided in an embodiment of the present application includes: a receiving unit 401, a generation unit 402, and a sending unit 403.

The receiving unit 401 is configured to receive a request message initiated by user equipment UE located in a Long Term Evolution LTE network, where the request message is used to request circuit switched fallback CSFB for an emergency call.

The request message initiated by the user equipment UE located in the Long Term Evolution LTE network may be an extended service request message.

The generation unit 402 is configured to generate a first notification message according to the request message received by the receiving unit 401, where the first notification message is used to instruct the eNB to hand over the UE from the LTE network to a 3G network for the CSFB, and the first notification message carries an emergency call indication, which is used to indicate to the eNB that the CSFB is triggered by the emergency call.

The first notification message is used to instruct the eNB to hand over the UE from the LTE network to a 3G network for the CSFB, and the first notification message carries an emergency call indication that is used to indicate to the eNB that the CSFB is triggered by the emergency call.

In addition, the first notification message includes indication information, where the indication information is used to indicate that the LTE network, the 3G network, and the UE support handover of the UE from the LTE network to a CS domain of the 3G network for the CSFB. The indication information is used to indicate that the LTE network, the 3G network, and the UE support single radio voice call continuity SRVCC handover.

The sending unit 403 is configured to send the first notification message to the evolved NodeB eNB.

The generation unit 402 is further configured to generate a first handover request message, where the first handover request message carries the emergency call indication, which is used to instruct the MSC to hand over the UE from the LTE network to the circuit switched CS domain of the 3G network for the emergency call, and the first handover request message further carries information about a cell of the 3G network or information about a cell that is of the LTE network and on which the UE currently camps, so that the mobile switching center MSC selects an emergency center according to the information about the cell of the 3G network or the information about the cell of the LTE network.

The sending unit 403 is further configured to send, to the MSC, the first handover request message generated by the generation unit.

The handover required message carries the information about the cell of the 3G network. The information about the cell of the 3G network includes an identity of the cell of the 3G; the information about the cell of the LTE network includes an identity of the cell of the LTE network.

The receiving unit 401 is further configured to: before the sending unit 403 sends the first handover request message to the MSC, receive a handover required message sent by the eNB, where the handover required message carries the emergency call indication.

Herein, the handover required message is a message for requiring handover from the LTE network to a packet switched PS domain of the 3G network, a message for requiring the handover from the LTE network to the CS domain of the 3G network, or a message for requiring handover from the LTE network to the PS domain and the CS domain of the 3G network.

The receiving unit 401 is further configured to: after the sending unit 403 sends the first handover request message to the MSC, receive a first handover response message that is sent by the MSC in response to the first handover request message, where the first handover response message includes information about a CS domain radio resource that is allocated by a base station of the 3G network to the UE.

The generation unit 402 is further configured to generate a handover requirement response message according to the first handover response message received by the receiving unit 401, where the handover requirement response message includes the information about the CS domain radio resource, and the information about the CS domain radio resource is used to hand over the UE from the LTE network to the CS domain of the 3G network for the CSFB.

The sending unit 403 is further configured to send, to the eNB, the handover requirement response message generated by the generation unit.

The generation unit 402 is further configured to: after the sending unit 403 sends the first handover request message to the MSC, generate a second handover request message, where the second handover request message is used to request the SGSN to hand over the UE from the LTE network to a packet switched PS domain of the 2G or 3G network for the CSFB.

The sending unit 403 is further configured to send the second handover request message to the serving general packet radio service support node SGSN.

The receiving unit 401 is further configured to receive a second handover request response message sent by the SGSN, where the second handover request response message includes a PS domain radio access bearer RAB, and the PS domain RAB is used to hand over the UE from the LTE network to the PS domain of the 2G or 3G network.

The generation unit 402 is further configured to generate a handover requirement response message according to the second handover request response message received by the receiving unit 401, where the handover requirement response message includes the PS domain RAB, so that the eNB sends the PS domain RAB to the UE.

The sending unit 403 is further configured to send the handover requirement response message to the eNB.

The receiving unit 401 is further configured to: after the sending unit 403 sends the first handover request message to the MSC, receive a first handover request response message sent by the MSC, where the first handover request response message includes a radio access bearer RAB, and the RAB is a RAB whose domain identifier indicates a PS domain, or the RAB is a PS RAB.

The generation unit 402 is further configured to generate a handover requirement response message according to the first handover request response message received by the receiving unit 401, where the handover requirement response message includes the RAB, so that the eNB sends the RAB to the UE.

The sending unit 403 is further configured to send the handover requirement response message to the eNB.

In addition, the notification message is further used to indicate that the LTE network, the 3G network, and the UE support the handover of the UE from the LTE network to the CS domain of the 3G network for the CSFB. The notification message includes indication information, where the indication information is used to indicate that the LTE network, the 3G network, and the UE support the handover of the UE from the LTE network to the CS domain of the 3G network for the CSFB. The indication information is used to indicate that the LTE network, the 3G network, and the UE support single radio voice call continuity SRVCC handover.

It should be noted that the MME may further include a determining unit, where the determining unit is configured to determine that the LTE network and the 3G network support the handover of the UE from the LTE network to the CS domain of the 3G network for the CSFB.

The sending unit 403 is further configured to send the first notification message to the eNB, where the first notification message is used to inform the eNB whether the LTE network and the 3G network support the handover of the UE from the LTE network to the circuit switched CS domain of the 3G network for the CSFB, so that the eNB initiates a handover requirement of handing over the UE from the LTE network to the circuit switched CS domain of the 3G network for the CSFB.

The mobility management entity in this embodiment can execute the method steps of the MME described in the method embodiments in FIG. 1, FIG. 2A and FIG. 2B, FIG. 3A and FIG. 3B, and FIG. 4. The receiving unit 401 is configured to receive a message sent by another entity to the MME, and the sending unit 402 is configured to send a message to the another entity. Persons skilled in the art may understand an action of and an action executed by each unit in the MME and a relationship between the units according to the steps executed in the method embodiments.

According to the mobility management entity provided in the present application, when a process of circuit switched fallback triggered by an emergency call is implemented, handover from an LTE network to a 3G network is triggered, and after UE is directly handed over from the LTE network to a CS domain of the 3G network, an MSC may select an emergency center according to cell information carried in a message sent by the MME. In the prior art, the MSC selects the emergency center by using an RNCID of a large range, and cannot quickly select an appropriate emergency center. By contrast, in the present application, the MSC can quickly select an appropriate emergency center according to the information about the cell, and quickly set up a call connection between the UE and the emergency center, which shortens call duration of an emergency call and improves user experience.

Figure 8:
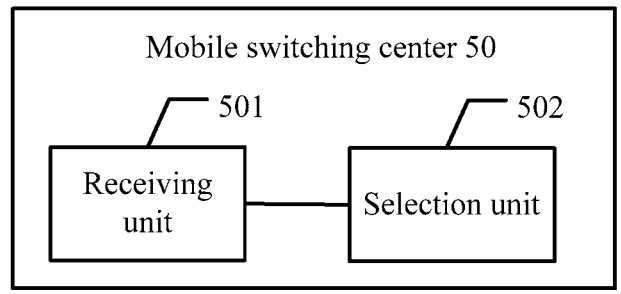
FIG. 8 is a structural block diagram of a mobile switching center MSC according to Embodiment 5 of the present application.

A mobile switching center 50 provided in an embodiment of the present application is shown in FIG. 8, and the mobile switching center includes: a receiving unit 501 and a selection unit 502.

The receiving unit 501 is configured to receive a first handover request message sent by a mobility management entity MME.

The first handover request message is used to request the MSC to hand over user equipment UE from a Long Term Evolution LTE network to a circuit switched CS domain of a 3G network for circuit switched fallback CSFB of an emergency call; the first handover request message carries an emergency call indication, which is used to instruct the MSC to hand over the UE from the LTE network to the CS domain of the 3G network for the emergency call; the first handover request message further carries information about a cell of the 3G network or information about a cell that is of the LTE network and on which the UE currently camps.

In addition, the information about the cell of the 3G network includes an identity of the cell of the 3G; the information about the cell of the LTE network includes an identity of the cell of the LTE network. The information about the cell of the 3G network includes an identity of the cell of the 3G; the information about the cell of the LTE network includes an identity of the cell of the LTE network.

The selection unit 502 is configured to select an emergency center for the UE according to the information about the cell of the 3G network or the information about the cell of the LTE network that is carried in the first handover request message received by the receiving unit 501.

The receiving unit 501 is further configured to: before the selection unit 502 selects the emergency center for the UE according to the information about the cell of the 3G network or the information about the cell of the LTE network that is carried in the first handover request message received by the receiving unit 501, receive a handover complete message sent by a base station of the 3G network, where the handover complete message is used to indicate that the UE has completed the handover from the LTE network to the CS domain of the 3G network.

The receiving unit 501 is further configured to receive an emergency call connection request message sent by the UE.

The selection unit 502 is specifically configured to query a domain name server, so as to select, for the UE, the emergency center corresponding to the information about the cell of the 3G network or the information about the cell of the LTE network.

The mobile switching center 50 further includes a generation unit and a sending unit. The generation unit is configured to generate a third handover request message, where the third handover request message is used to request the base station of the 3G network to allocate a CS domain resource to the UE for the handover to the CS domain of the 3G network.

The sending unit is further configured to send the third handover request message to the base station of the 3G network.

The receiving unit 501 is further configured to receive a third handover request response message sent by the base station of the 3G network, where the third handover request response message includes information about the CS domain radio resource that is allocated by the base station of the 3G network to the UE for the handover to the CS domain of the 3G network.

The generation unit is further configured to generate a first handover response message, where the first handover response message includes the information about the CS domain radio resource.

The sending unit is further configured to send the first handover response message to the MME.

The generation unit is further configured to generate a third handover request message, where the third handover request message is used to request the base station of the 3G network to hand over the UE from the LTE network to the CS domain of the 3G network for the CSFB.

The sending unit is further configured to send the third handover request message to the base station of the 3G network.

The receiving unit 501 is further configured to receive a third handover request acknowledgement message sent by the base station of the 3G network, where the third handover request acknowledgement message includes a radio access bearer RAB, and the RAB is a RAB whose domain identifier indicates a packet switched PS domain, or the RAB is a PS RAB.

The generation unit is further configured to generate a first handover request response message, where the first handover request response message includes the RAB.

Certainly, alternatively, the RAB may be another RAB that can be used to hand over the UE from the LTE network to a PS domain of the 3G network. From a perspective of the UE, handover to the PS domain of the 3G network is determined according to the RAB, so that the UE is handed over to the 3G network and then a CS domain call may be processed.

The sending unit is further configured to send the first handover request response message to the MME, and the second notification message is used to request the base station to allocate a CS domain resource to the UE.

The sending unit is further configured to: after the receiving unit 501 receives at least one of the following messages, send the second notification message to the base station.

The following messages include a handover complete message sent by the base station, a connection management service request message sent by the UE, the call connection request message sent by the UE, and a paging response message sent by the UE.

Herein, the selection unit 502 of the MSC can quickly select an appropriate emergency center according to the information about the cell of the 3G network or the information about the cell of the LTE network that is carried in the first handover request message, and further set up a call connection between the UE and the emergency center, which shortens duration for setting up an emergency call.

In an emergency call, the UE is a calling party. Certainly, after the MSC sets up the emergency call connection, the UE may also be a called party of the call.

In the foregoing description, the receiving unit 501 receives a first call connection setup request message sent by the UE, where the first call connection setup request message is used to request the MSC to generate a first session for the CSFB of the emergency call. The MSC in this embodiment can execute the method steps of the MSC described in the method embodiments in FIG. 1, FIG. 2A and FIG. 2B, FIG. 3A and FIG. 3B, and FIG. 5. The receiving unit 501 is configured to receive a message sent by another entity to the MSC, and the sending unit is configured to send a message to the another entity. Persons skilled in the art may understand an action of and an action executed by each unit in the MSC and a relationship between the units according to the steps executed in the method embodiments.

According to the mobile switching center provided in the present application, when a process of circuit switched fallback triggered by an emergency call is implemented, handover from an LTE network to a 3G network is triggered, and after UE is directly handed over from the LTE network to a CS domain of the 3G network, the MSC may select an emergency center according to cell information carried in a message sent by an MME. In the prior art, the MSC selects the emergency center by using an RNCID of a large range, and cannot quickly select an appropriate emergency center. By contrast, in the present application, the MSC can quickly select an appropriate emergency center according to the information about the cell, and quickly set up a call connection between the UE and the emergency center, which shortens call duration of an emergency call and improves user experience.

Figure 9:
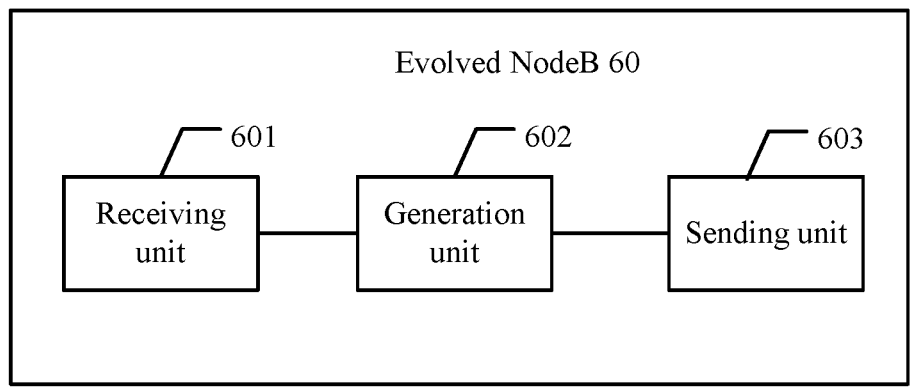
FIG. 9 is a structural block diagram of an evolved NodeB eNB according to Embodiment 5 of the present application.

An evolved NodeB eNB 60 provided in an embodiment of the present application is shown in FIG. 9, and the eNB includes: a receiving unit 601, a generation unit 602, and a sending unit 603.

The receiving unit 601 is configured to receive a first notification message sent by a mobility management entity MME. The first notification message is used to instruct the eNB to hand over user equipment UE from the LTE network to a 3G network for circuit switched fallback CSFB of an emergency call; the first notification message carries an emergency call indication, which is used to indicate to the eNB that the CSFB is triggered by the emergency call.

In addition, the notification message is further used to indicate that the LTE network, the 3G network, and the UE support handover of the UE from the LTE network to a CS domain of the 3G network for the CSFB.

The generation unit 602 is configured to generate a handover required message according to the first notification message received by the receiving unit.

The handover required message is used to request the MME to hand over the UE from the LTE network to the circuit switched CS domain of the 3G network, a packet switched PS domain of the 3G network, or the CS domain and a PS domain of the 3G network for the CSFB; the handover required message carries the emergency call indication, which is used to indicate that the handover required message is a handover request message corresponding to the emergency call.

The handover required message carries information about a cell of the 3G network, so that the MME sends the information about the cell of the 3G network to a mobile switching center MSC and selects an emergency center according to the information about the cell of the 3G network. The information about the cell of the 3G network includes an identity of the cell of the 3G.

It should be noted that the handover required message is a message for requiring the handover from the LTE network to the packet switched PS domain of the 3G network, a message for requiring the handover from the LTE network to the CS domain of the 3G network, or a message for requiring the handover from the LTE network to the PS domain and the CS domain of the 3G network.

In addition, the handover required message includes UE capability information, so that the MME includes the UE capability information in a first handover request message sent to the mobile switching center MSC.

The sending unit 603 is configured to send the handover required message to the MME.

The receiving unit 601 is further configured to: after the sending unit 603 sends the handover required message to the MME, receive a handover requirement response message sent by the MME, where the handover requirement response message includes information about a CS domain radio resource, and the information about the CS domain radio resource is used to hand over the UE from the LTE network to the CS domain of the 3G network.

The generation unit 602 is further configured to generate a handover command, where the handover command is used to instruct the UE to hand over from the LTE network to the CS domain of the 3G network, and the handover command includes the information about the CS domain radio resource.

The sending unit 603 is further configured to send the handover command to the UE.

The receiving unit 601 is further configured to: after the sending unit 603 sends the handover required message to the MME, receive a handover requirement response message sent by the MME, where the handover requirement response message includes a packet switched PS domain radio access bearer RAB, and the PS domain RAB is used to hand over the UE from the LTE network to the PS domain of the 2G or 3G network for the CSFB.

The generation unit 602 is further configured to generate a handover command, where the handover command includes the PS domain RAB.

In the foregoing description, the handover command is used to instruct the UE to hand over from the LTE network to the circuit switched CS domain of the 3G network for the CSFB. In addition, the eNB further includes a determining unit, where the determining unit is configured to determine that the UE supports the handover from the LTE network to the CS domain of the 3G network.

The determining unit is further configured to determine that the UE supports the handover from the LTE network to the PS domain of the 3G network.

The handover command is further used to instruct the UE to hand over from the LTE network to the PS domain of the 3G network, the handover command includes information about a PS domain resource of the 3G network, and the information about the PS domain resource of the 3G network is used to hand over the UE from the LTE network to the PS domain of the 3G network.

The evolved NodeB in this embodiment can execute the method steps of the evolved NodeB described in the method embodiments in FIG. 1, FIG. 2A and FIG. 2B, FIG. 3A and FIG. 3B, and FIG. 6. Persons skilled in the art can also learn an action of each unit in the evolved NodeB and a relationship between the actions of the units according to the steps executed in the method embodiments.

According to the evolved NodeB provided in this embodiment of the present application, when handover from LTE to a 3G network is performed for SRVCC-based CSFB, information about a cell is added to an emergency call indication carried in a first handover request message sent by an MME, and an MSC selects an emergency center according to the cell information carried in the first handover request message. In the prior art, the emergency center is selected according to an RNC ID with relatively coarse granularity, and a time of an emergency call is relatively long. By contrast, according to the method provided in the present application, the MSC can quickly select an appropriate emergency center according to the information about the cell, and further quickly set up an emergency call, which shortens a time of an emergency call and improves user experience.

Embodiment 6

An embodiment of the present application provides a mobility management entity. In hardware implementation, the sending unit in FIG. 7 may be a transmitter or a transceiver, the receiving unit may be a receiver or a transceiver, and the sending unit and the receiving unit may be integrated to form a transceiving unit, which is a transceiver corresponding to the hardware implementation. The generation unit and the determining unit in the embodiment in FIG. 5 may be built into a processor of the mobility management entity in a form of hardware or a form of software. The processor may be a central processing unit (CPU), or a single-chip microcomputer.

Figure 10:
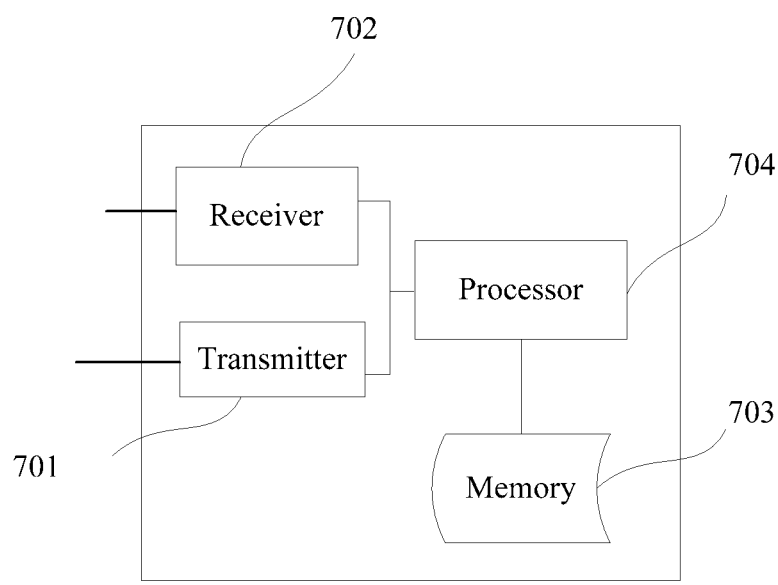
FIG. 10 is a structural block diagram of a mobility management entity MME according to Embodiment 6 of the present application.

As shown in FIG. 10, the mobility management entity includes: a transmitter 701, a receiver 702, a memory 703, and a processor 704 that is separately connected to the transmitter 701, the receiver 702, and the memory 703. Certainly, the mobility management entity may further include general components, such as a baseband processing component, an intermediate radio frequency processing component, and an input and output apparatus, which is not limited in this embodiment of the present application. The memory 703 stores a set of program code, and the processor 704 is configured to invoke the program code stored in the memory 703, so as to execute the following operations:

The processor 704 is configured to receive, by using the receiver 702, a request message initiated by user equipment UE located in a Long Term Evolution LTE network, where the request message is used to request circuit switched fallback CSFB for an emergency call.

The request message initiated by the user equipment UE located in the Long Term Evolution LTE network may be an extended service request message.

The processor 704 is configured to generate a first notification message according to the received request message, where the first notification message is used to instruct the eNB to hand over the UE from the LTE network to a 3G network for the CSFB, and the first notification message carries an emergency call indication which is used to indicate to the eNB that the CSFB is triggered by the emergency call.

The first notification message is used to instruct the eNB to hand over the UE from the LTE network to a 3G network for the CSFB, and the first notification message carries an emergency call indication, which is used to indicate to the eNB that the CSFB is triggered by the emergency call.

In addition, the first notification message includes indication information, where the indication information is used to indicate that the LTE network, the 3G network, and the UE support handover of the UE from the LTE network to a CS domain of the 3G network for the CSFB. The indication information is used to indicate that the LTE network, the 3G network, and the UE support single radio voice call continuity SRVCC handover.

The processor 704 is further configured to send the first notification message to the evolved NodeB eNB by using the transmitter 701.

The processor 704 is further configured to generate a first handover request message, where the first handover request message carries the emergency call indication, which is used to instruct the MSC to hand over the UE from the LTE network to the circuit switched CS domain of the 3G network for the emergency call, and the first handover request message further carries information about a cell of the 3G network or information about a cell that is of the LTE network and on which the UE currently camps, so that the mobile switching center MSC selects an emergency center according to the information about the cell of the 3G network or the information about the cell of the LTE network.

Herein, the first handover request message includes first indication information, where the first indication information is used to request the MSC to hand over the UE from the LTE network to the CS domain of the 3G network for the CSFB, or the first indication information is used to request the MSC to hand over the UE from the LTE network to the CS domain of the 3G network for the CSFB and is used to indicate that the UE supports handover from the LTE network to a PS domain of the 3G network.

The processor 704 is further configured to: before sending, by using the transmitter 701 to the MSC, the first handover request message generated by the generation unit, receive, by using the receiver 702, a handover required message sent by the eNB, where the handover required message carries the emergency call indication.

Herein, the handover required message is a message for requiring the handover from the LTE network to the packet switched PS domain of the 3G network, a message for requiring the handover from the LTE network to the CS domain of the 3G network, or a message for requiring handover from the LTE network to the PS domain and the CS domain of the 3G network.

The processor 704 is further configured to send, by using the transmitter 701, the first handover request message generated by the generation unit to the MSC.

The handover required message carries the information about the cell of the 3G network. The information about the cell of the 3G network includes an identity of the cell of the 3G; the information about the cell of the LTE network includes an identity of the cell of the LTE network.

The processor 704 is further configured to: after sending the first handover request message to the MSC by using the receiver 702, receive a first handover response message that is sent by the MSC in response to the first handover request message, where the first handover response message includes information about a CS domain radio resource that is allocated by a base station of the 3G network to the UE.

The processor 704 is further configured to generate a handover requirement response message according to the received first handover response message, where the handover requirement response message includes the information about the CS domain radio resource, and the information about the CS domain radio resource is used to hand over the UE from the LTE network to the CS domain of the 3G network for the CSFB.

The processor 704 is further configured to send, by using the transmitter 701, the handover requirement response message generated by the generation unit to the eNB.

The processor 704 is further configured to: after sending the first handover request message to the MSC, generate a second handover request message, where the second handover request message is used to request the SGSN to hand over the UE from the LTE network to the packet switched PS domain of the 2G or 3G network for the CSFB.

The processor 704 is further configured to send the second handover request message to the serving general packet radio service support node SGSN by using the transmitter 701.

The processor 704 is further configured to receive, by using the receiver 702, a second handover request response message sent by the SGSN, where the second handover request response message includes a PS domain radio access bearer RAB, and the PS domain RAB is used to hand over the UE from the LTE network to the PS domain of the 2G or 3G network.

The processor 704 is further configured to generate a handover requirement response message according to the received second handover request response message, where the handover requirement response message includes the PS domain RAB, so that the eNB sends the PS domain RAB to the UE.

The processor 704 is further configured to send, by using the transmitter 701, the handover requirement response message to the eNB.

The processor 704 is further configured to: after sending the first handover request message to the MSC by using the receiver 702, receive a first handover request response message sent by the MSC, where the first handover request response message includes a radio access bearer RAB, and the RAB is a RAB whose domain identifier indicates a PS domain, or the RAB is a PS RAB.

The processor 704 is further configured to generate a handover requirement response message according to the received first handover request response message, where the handover requirement response message includes the RAB, so that the eNB sends the RAB to the UE.

The processor 704 is further configured to send, by using the transmitter 701, the handover requirement response message to the eNB.

In addition, the notification message is further used to indicate that the LTE network, the 3G network, and the UE support the handover of the UE from the LTE network to the CS domain of the 3G network for the CSFB. The notification message includes indication information, where the indication information is used to indicate that the LTE network, the 3G network, and the UE support the handover of the UE from the LTE network to the CS domain of the 3G network for the CSFB. The indication information is used to indicate that the LTE network, the 3G network, and the UE support single radio voice call continuity SRVCC handover.

It should be noted that the processor 704 is further configured to determine that the LTE network and the 3G network support the handover of the UE from the LTE network to the CS domain of the 3G network for the CSFB.

The processor 704 is further configured to send, by using the transmitter 701, the first notification message to the eNB, where the first notification message is used to inform the eNB whether the LTE network and the 3G network support the handover of the UE from the LTE network to the circuit switched CS domain of the 3G network for the CSFB, so that the eNB initiates a handover requirement of handing over the UE from the LTE network to the circuit switched CS domain of the 3G network for the CSFB. According to the mobility management entity provided in the present application, when a process of circuit switched fallback triggered by an emergency call is implemented, handover from an LTE network to a 3G network is triggered, and after UE is directly handed over from the LTE network to a CS domain of the 3G network, an MSC may select an emergency center according to cell information carried in a message sent by the MME. In the prior art, the MSC selects the emergency center by using an RNCID of a large range, and cannot quickly select an appropriate emergency center. By contrast, in the present application, the MSC can quickly select an appropriate emergency center according to the information about the cell, and quickly set up a call connection between the UE and the emergency center, which shortens call duration of an emergency call and improves user experience.

An embodiment of the present application provides a mobile switching center. In hardware implementation, the receiving unit in FIG. 8 may be a receiver or a transceiver, the sending unit in the embodiment in FIG. 8 may be a transmitter or a transceiver, and the sending unit and the receiving unit may be integrated to form a transceiving unit, which is a transceiver corresponding to the hardware implementation. The generation unit and the selection unit in the embodiment in FIG. 5 may be built into a processor of the mobility management entity in a form of hardware or a form of software. The processor may be a central processing unit (CPU), or a single-chip microcomputer.

Figure 11:
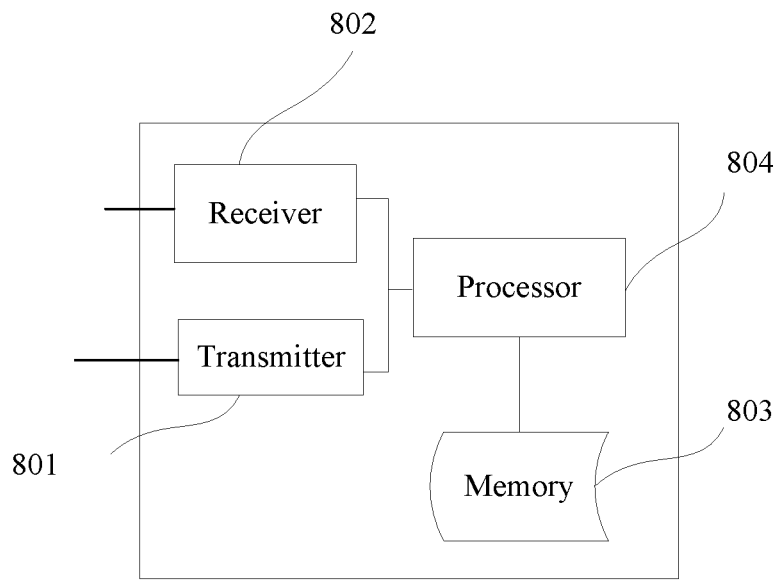
FIG. 11 is a structural block diagram of a mobile switching center MSC according to Embodiment 6 of the present application.

As shown in FIG. 11, the mobile switching center includes a transmitter 801, a receiver 802, a memory 803, and a processor 704 that is separately connected to the transmitter 801, the receiver 802, and the memory 803. Certainly, the mobile switching center may further include general components, such as a baseband processing component, an intermediate radio frequency processing component, and an input and output apparatus, which is not limited in this embodiment of the present application. The memory 803 stores a set of program code, and the processor 804 is configured to invoke the program code stored in the memory 803, so as to execute the following operations:

The processor 804 is configured to receive, by using the receiver 802, a first handover request message sent by a mobility management entity MME.

The first handover request message is used to request the MSC to hand over user equipment UE from a Long Term Evolution LTE network to a circuit switched CS domain of a 3G network for circuit switched fallback CSFB of an emergency call; the first handover request message carries an emergency call indication, which is used to instruct the MSC to hand over the UE from the LTE network to the CS domain of the 3G network for the emergency call; the first handover request message further carries information about a cell of the 3G network or information about a cell that is of the LTE network and on which the UE currently camps.

In addition, the information about the cell of the 3G network includes an identity of the cell of the 3G; the information about the cell of the LTE network includes an identity of the cell of the LTE network. The information about the cell of the 3G network includes an identity of the cell of the 3G; the information about the cell of the LTE network includes an identity of the cell of the LTE network.

The processor 804 is configured to select an emergency center for the UE according to the information about the cell of the 3G network or the information about the cell of the LTE network that is carried in the received first handover request message.

The processor 804 is configured to: before selecting the emergency center for the UE according to the information about the cell of the 3G network or the information about the cell of the LTE network that is carried in the received first handover request message, receive, by using the receiver 802, a handover complete message sent by a base station of the 3G network, where the handover complete message is used to indicate that the UE has completed the handover from the LTE network to the CS domain of the 3G network.

The processor 804 is configured to receive, by using the receiver 802, an emergency call connection request message sent by the UE.

The processor 804 is specifically configured to query a domain name server, so as to select, for the UE, the emergency center corresponding to the information about the cell of the 3G network or the information about the cell of the LTE network.

The processor 804 is configured to generate a third handover request message, where the third handover request message is used to request the base station of the 3G network to allocate a CS domain resource to the UE for the handover to the CS domain of the 3G network.

The processor 804 is configured to send, by using the transmitter 801, the third handover request message to the base station of the 3G network.

The processor 804 is configured to receive, by using the receiver 802, a third handover request response message sent by the base station of the 3G network, where the third handover request response message includes information about the CS domain radio resource that is allocated by the base station of the 3G network to the UE for the handover to the CS domain of the 3G network.

The processor 804 is further configured to generate a first handover response message, where the first handover response message includes the information about the CS domain radio resource.

The processor 804 is configured to send, by using the transmitter 801, the first handover response message to the MME.

The processor 804 is further configured to generate a third handover request message, where the third handover request message is used to request the base station of the 3G network to hand over the UE from the LTE network to the CS domain of the 3G network for the CSFB.

The processor 804 is further configured to send, by using the transmitter 801, the third handover request message to the base station of the 3G network.

The processor 804 is configured to receive, by using the receiver 802, a third handover request acknowledgement message sent by the base station of the 3G network, where the third handover request acknowledgement message includes a radio access bearer RAB, and the RAB is a RAB whose domain identifier indicates a packet switched PS domain, or the RAB is a PS RAB.

The processor 804 is configured to generate a first handover request response message, where the first handover request response message includes the RAB.

Certainly, alternatively, the RAB may be another RAB that can be used to hand over the UE from the LTE network to a PS domain of the 3G network. From a perspective of the UE, handover to the PS domain of the 3G network is determined according to the RAB, so that the UE is handed over to the 3G network and then a CS domain call may be processed.

The processor 804 is further configured to send, by using the transmitter 801, the first handover request response message to the MME, and the second notification message is used to request the base station to allocate a CS domain resource to the UE.

The processor 804 is further configured to: after receiving at least one of the following messages, send, by using the transmitter 801, the second notification message to the base station.

The following messages include a handover complete message sent by the base station, a connection management service request message sent by the UE, the call connection request message sent by the UE, and a paging response message sent by the UE.

Herein, the processor 804 of the MSC can quickly select an appropriate emergency center according to the information about the cell of the 3G network or the information about the cell of the LTE network that is carried in the first handover request message, and further set up a call connection between the UE and the emergency center, which shortens duration for setting up an emergency call.

In an emergency call, the UE is a calling party. Certainly, after the MSC sets up the emergency call connection, the UE may also be a called party of the call.

In the foregoing description, the processor 804 receives, by using the receiver 802, a first call connection setup request message sent by the UE, where the first call connection setup request message is used to request the MSC to generate a first session for the CSFB of the emergency call.

According to the mobile switching center provided in the present application, when a process of circuit switched fallback triggered by an emergency call is implemented, handover from an LTE network to a 3G network is triggered, and after UE is directly handed over from the LTE network to a CS domain of the 3G network, the MSC may select an emergency center according to cell information carried in a message sent by an MME. In the prior art, the MSC selects the emergency center by using an RNCID of a large range, and cannot quickly select an appropriate emergency center. By contrast, in the present application, the MSC can quickly select an appropriate emergency center according to the information about the cell, and quickly set up a call connection between the UE and the emergency center, which shortens call duration of an emergency call and improves user experience.

An embodiment of the present application provides an evolved NodeB. In hardware implementation, the receiving unit in FIG. 9 may be a receiver or a transceiver, the sending unit may be a transmitter or a transceiver, and the sending unit and the receiving unit may be integrated to form a transceiving unit, which is a transceiver corresponding to the hardware implementation. The generation unit in the embodiment in FIG. 5 may be built into a processor of the evolved NodeB in a form of hardware or a form of software. The processor may be a central processing unit (CPU), or a single-chip microcomputer.

Figure 12:
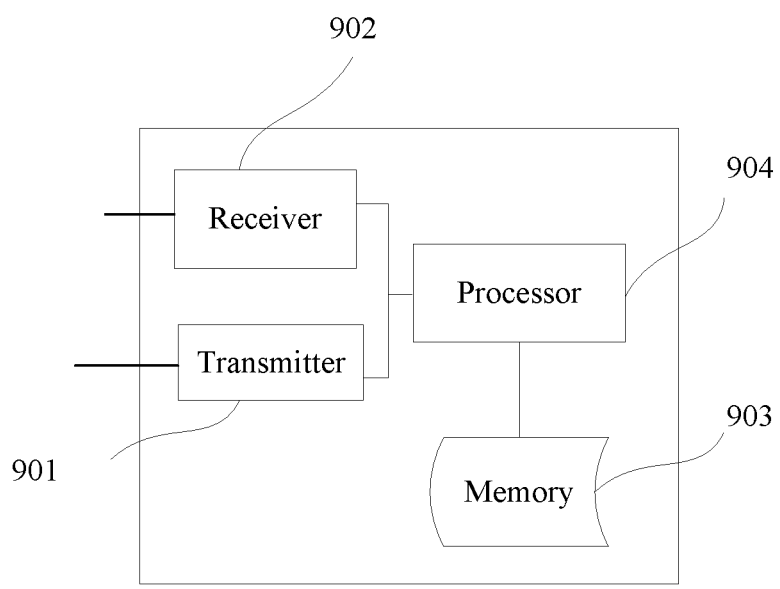
FIG. 12 is a structural block diagram of an evolved NodeB eNB according to Embodiment 6 of the present application.

As shown in FIG. 12, the evolved NodeB includes a transmitter 901, a receiver 902, a memory 903, and a processor 904 that is separately connected to the transmitter 901, the receiver 902, and the memory 903. Certainly, the evolved NodeB may further include general components, such as a baseband processing component, an intermediate radio frequency processing component, and an input and output apparatus, which is not limited in this embodiment of the present application. The memory 903 stores a set of program code, and the processor 904 is configured to invoke the program code stored in the memory 903, so as to execute the following operations:

The processor 904 is configured to receive, by using the receiver 902, a first notification message sent by a mobility management entity MME. The first notification message is used to instruct the eNB to hand over user equipment UE from the LTE network to a 3G network for circuit switched fallback CSFB of an emergency call; the first notification message carries an emergency call indication, which is used to indicate to the eNB that the CSFB is triggered by the emergency call.

In addition, the notification message is further used to indicate that the LTE network, the 3G network, and the UE support handover of the UE from the LTE network to a CS domain of the 3G network for the CSFB.

The processor 904 is configured to generate a handover required message according to the first notification message received by the receiving unit.

The handover required message is used to request the MME to hand over the UE from the LTE network to the circuit switched CS domain of the 3G network, a packet switched PS domain of the 3G network, or the CS domain and a PS domain of the 3G network for the CSFB; the handover required message carries the emergency call indication, which is used to indicate that the handover required message is a handover request message corresponding to the emergency call.

The handover required message carries information about a cell of the 3G network, so that the MME sends the information about the cell of the 3G network to a mobile switching center MSC and selects an emergency center according to the information about the cell of the 3G network. The information about the cell of the 3G network includes an identity of the cell of the 3G.

It should be noted that the handover required message is a message for requiring the handover from the LTE network to the packet switched PS domain of the 3G network, a message for requiring the handover from the LTE network to the CS domain of the 3G network, or a message for requiring the handover from the LTE network to the PS domain and the CS domain of the 3G network.

In addition, the handover required message includes UE capability information, so that the MME includes the UE capability information in a first handover request message sent to the mobile switching center MSC.

The processor 904 is configured to send, by using the transmitter 901, the handover required message to the MME.

The processor 904 is configured to: after sending the handover required message to the MME by using the transmitter 901, receive, by using the receiver 902, a handover requirement response message sent by the MME, where the handover requirement response message includes information about a CS domain radio resource, and the information about the CS domain radio resource is used to hand over the UE from the LTE network to the CS domain of the 3G network.

The processor 904 is configured to generate a handover command, where the handover command is used to instruct the UE to hand over from the LTE network to the CS domain of the 3G network, and the handover command includes the information about the CS domain radio resource.

The processor 904 is configured to send, by using the transmitter 901, the handover command to the UE.

The processor 904 is configured to: after sending, by using the transmitter 901, the handover required message to the MME, receive, by using the receiver 902, a handover requirement response message sent by the MME, where the handover requirement response message includes a packet switched PS domain radio access bearer RAB, and the PS domain RAB is used to hand over the UE from the LTE network to the PS domain of the 2G or 3G network for the CSFB.

The processor 904 is further configured to generate a handover command, where the handover command includes the PS domain RAB.

The processor 904 is configured to send, by using the transmitter 901, the handover command to the UE.

In the foregoing description, the handover command is used to instruct the UE to hand over from the LTE network to the circuit switched CS domain of the 3G network for the CSFB.

In addition, the processor 904 is further configured to determine that the UE supports the handover from the LTE network to the CS domain of the 3G network.

The processor 904 is further configured to determine that the UE supports the handover from the LTE network to the PS domain of the 3G network.

The handover command is further used to instruct the UE to hand over from the LTE network to the PS domain of the 3G network, the handover command includes information about a PS domain resource of the 3G network, and the information about the PS domain resource of the 3G network is used to hand over the UE from the LTE network to the PS domain of the 3G network.

According to the evolved NodeB provided in the present application, when a process of circuit switched fallback triggered by an emergency call is implemented, handover from an LTE network to a 3G network is triggered, and after UE is directly handed over from the LTE network to a CS domain of the 3G network, an MSC may select an emergency center according to cell information carried in a message sent by an MME. In the prior art, the MSC selects the emergency center by using an RNCID of a large range, and cannot quickly select an appropriate emergency center. By contrast, in the present application, the MSC can quickly select an appropriate emergency center according to the information about the cell, and quickly set up a call connection between the UE and the emergency center, which shortens call duration of an emergency call and improves user experience.

Embodiment 7

Figure 13:
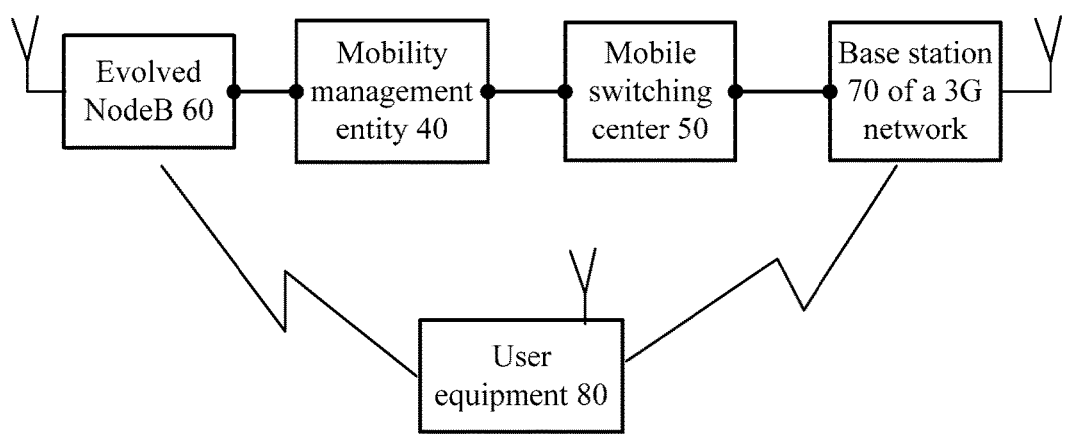
FIG. 13 is a structural diagram of an emergency center selection system according to Embodiment 7 of the present application.

Referring to FIG. 13, an embodiment of a network handover system provided in an embodiment of the present application includes: a mobility management entity 40, an evolved NodeB 60, a mobile switching center 50, a base station 70 of a 3G network, and user equipment 80.

The mobility management entity is the mobility management entity shown in FIG. 7, the mobile switching center is the mobile switching center shown in FIG. 8, and the evolved NodeB is the evolved NodeB shown in FIG. 9. For actions executed by the mobility management entity, the evolved NodeB, the mobile switching center, the base station of the 3G network, and the user equipment, and interactions between the mobility management entity, the evolved NodeB, the mobile switching center, the base station of the 3G network, and the user equipment, reference may be made to the descriptions about FIG. 1, FIG. 2A and FIG. 2B, and FIG. 3A and FIG. 3B and descriptions about the method embodiments and the apparatus embodiments in FIG. 4 to FIG. 9. The handover required message sent by the evolved NodeB 50 includes a source-to-target transparent container, where the source-to-target transparent container includes second indication information, where the second indication information is used to request the base station of the 3G network to hand over the UE from the LTE network to a CS domain of the 3G network for the CSFB. In a process of an emergency call, the user equipment 80 also initiates a request message to the mobility management entity 40 for circuit switched fallback CSFB of the emergency call. Therefore, the mobility management entity 40, the evolved NodeB 60, the mobile switching center 50, the base station 70 of the 3G network, and the user equipment 80 jointly form the network handover system provided in this embodiment of the present application.

According to the emergency center selection system provided in the present application, when a process of circuit switched fallback triggered by an emergency call is implemented, handover from an LTE network to a 3G network is triggered, and after UE is directly handed over from the LTE network to a CS domain of the 3G network, an MSC may select an emergency center according to cell information carried in a message sent by an MME. In the prior art, the MSC selects the emergency center by using an RNCID of a large range, and cannot quickly select an appropriate emergency center. By contrast, in the present application, the MSC can quickly select an appropriate emergency center according to the information about the cell, and quickly set up a call connection between the UE and the emergency center, which shortens call duration of an emergency call and improves user experience.

Persons of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. Persons skilled in the art may use different methods to implement the described functions for each particular application, but it should not be considered that the implementation goes beyond the scope of the present application.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present application.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present application, but are not intended to limit the protection scope of the present application. Any modification or replacement readily figured out by persons skilled in the art within the technical scope disclosed in the present application shall fall within the protection scope of the present application. Therefore, the protection scope of the present application shall be subject to the protection scope of the claims.

What is claimed is:

1. An emergency center selection method, the method comprising:
   receiving, by a mobility management entity (MME), a request message initiated by user equipment (UE) located in a Long Term Evolution (LTE) network, wherein the request message is used to request circuit switched fallback (CSFB) for an emergency call;
   sending, by the MME, a first notification message to an evolved NodeB (eNB) according to the request message, wherein the first notification message is used to instruct the eNB to hand over the UE from the LTE network to a 3G network for the CSFB, and the first notification message carries an emergency call indication, which is used to indicate to the eNB that the CSFB is triggered by the emergency call; and
   sending, by the MME, a first handover request message to a mobile switching center (MSC), wherein the first handover request message carries the emergency call indication, which is used to instruct the MSC to hand over the UE from the LTE network to a circuit switched (CS) domain of the 3G network for the emergency call, and the first handover request message further carries information about a cell of the 3G network or information about a cell that is of the LTE network and on which the UE currently camps, the information about the cell of the 3G network or the information about the cell of the LTE network is configured to instruct the MSC to select an emergency center.

2. The method according to claim 1, wherein before the sending, by the MME, a first handover request message to an MSC, the method further comprises:
   receiving, by the MME, a handover required message sent by the eNB, wherein the handover required message carries the emergency call indication and the information about the cell of the 3G network.

3. The method according to claim 1, wherein the information about the cell of the 3G network comprises an identity of the cell of the 3G, and the information about the cell of the LTE network comprises an identity of the cell of the LTE network.

4. The method according to claim 1, wherein after the sending, by the MME, a first handover request message to an MSC, the method further comprises:
   receiving, by the MME, a first handover response message that is sent by the MSC in response to the first handover request message, wherein the first handover response message comprises information about a CS domain radio resource that is allocated by a base station of the 3G network to the UE; and
   sending, by the MME, a handover required response message to the eNB, wherein the handover required response message comprises the information about the CS domain radio resource, and the information about the CS domain radio resource is used to hand over the UE from the LTE network to the CS domain of the 3G network for the CSFB.

5. The method according to claim 1, wherein after the sending, by the MME, a first handover request message to an MSC, the method further comprises:
   sending, by the MME, a second handover request message to a serving general packet radio service support node (SGSN), wherein the second handover request message is used to request the SGSN to hand over the UE from the LTE network to a packet switched (PS) domain of the 3G network for the CSFB;
   receiving, by the MME, a second handover request response message sent by the SGSN, wherein the second handover request response message comprises a PS domain radio access bearer (RAB), and the PS domain RAB is used to hand over the UE from the LTE network to the PS domain of the 2G or 3G network; and
   sending, by the MME, a handover required response message to the eNB according to the second handover request response message, wherein the handover required response message comprises the PS domain RAB, to enable the eNB to send the PS domain RAB to the UE.

6. The method according to claim 1, wherein after the sending, by the MME, a first handover request message to an MSC, the method further comprises:
   receiving, by the MME, a first handover request response message sent by the MSC, wherein the first handover request response message comprises a radio access bearer (RAB), and the RAB is a RAB whose domain identifier indicates a packet switched (PS) domain, or the RAB is a PS RAB; and
   sending, by the MME, a handover required response message to the eNB according to the first handover request response message, wherein the handover required response message comprises the RAB, to enable the eNB to send the RAB to the UE.

7. A mobility management entity (MME), comprising:
   a receiving unit, configured to receive a request message initiated by user equipment (UE) located in a Long Term Evolution (LTE) network, wherein the request message is used to request circuit switched fallback (CSFB) for an emergency call;
   a generation unit, configured to generate a first notification message according to the request message received by the receiving unit, wherein the first notification message is used to instruct the eNB to hand over the UE from the LTE network to a 3G network for the CSFB, and the first notification message carries an emergency call indication, which is used to indicate to the eNB that the CSFB is triggered by the emergency call; and
   a sending unit, configured to send the first notification message to the evolved NodeB eNB; wherein:
   the generation unit is further configured to generate a first handover request message, wherein the first handover request message carries the emergency call indication, which is used to instruct a mobile switching center (MSC) to hand over the UE from the LTE network to a circuit switched (CS) domain of the 3G network for the emergency call, and the first handover request message further carries information about a cell of the 3G network or information about a cell that is of the LTE network and on which the UE currently camps, the information about the cell of the 3G network or the information about the cell of the LTE network is configured to instruct the MSC to select an emergency center; and the sending unit is further configured to send, to the MSC, the first handover request message generated by the generation unit.

8. The MME according to claim 7, wherein:
the receiving unit is further configured to receive a handover required message sent by the eNB, wherein the handover required message carries the emergency call indication and the information about the cell of the 3G network.

9. The MME according to claim 7, wherein the information about the cell of the 3G network comprises an identity of the cell of the 3G, and the information about the cell of the LTE network comprises an identity of the cell of the LTE network.

10. The MME according to claim 7, wherein:
the receiving unit is further configured to: after the sending unit sends the first handover request message to the MSC, receive a first handover response message that is sent by the MSC in response to the first handover request message, wherein the first handover response message comprises information about a CS domain radio resource that is allocated by a base station of the 3G network to the UE;
the generation unit is further configured to generate a handover requirement response message according to the first handover response message received by the receiving unit, wherein the handover requirement response message comprises the information about the CS domain radio resource, and the information about the CS domain radio resource is used to hand over the UE from the LTE network to the CS domain of the 3G network for the CSFB; and
a sending unit is further configured to send, to the eNB, the handover requirement response message generated by the generation unit.

11. The MME according to claim 7, wherein:
the generation unit is further configured to: after the sending unit sends the first handover request message to the MSC, generate a second handover request message, wherein the second handover request message is used to request a serving general packet radio service support node (SGSN) to hand over the UE from the LTE network to a packet switched (PS) domain of the 2G or 3G network for the CSFB;
the sending unit is further configured to send the second handover request message to the SGSN;
the receiving unit is further configured to receive a second handover request response message sent by the SGSN, wherein the second handover request response message comprises a PS domain radio access bearer RAB, and the PS domain RAB is used to hand over the UE from the LTE network to the PS domain of the 2G or 3G network;
the generation unit is further configured to generate a handover requirement response message according to the second handover request response message received by the receiving unit, wherein the handover requirement response message comprises the PS domain RAB, to enable the eNB to send the PS domain RAB to the UE; and
the sending unit is further configured to send the handover requirement response message to the eNB.

12. The MME according to claim 7, wherein:
the receiving unit is further configured to: after the sending unit sends the first handover request message to the MSC, receive a first handover request response message sent by the MSC, wherein the first handover request response message comprises a radio access bearer (RAB), and the RAB is a RAB whose domain identifier indicates a packet switched (PS) domain, or the RAB is a PS RAB;
the generation unit is further configured to generate a handover requirement response message according to the first handover request response message received by the receiving unit, wherein the handover requirement response message comprises the RAB, so that the eNB sends the RAB to the UE; and
the sending unit is further configured to send the handover requirement response message to the eNB.

13. A mobile switching center (MSC), comprising:
a receiving unit, configured to receive a first handover request message sent by a mobility management entity (MME), wherein the first handover request message is used to request the MSC to hand over user equipment (UE) from a Long Term Evolution (LTE) network to a circuit switched (CS) domain of a 3G network for circuit switched fallback (CSFB) of an emergency call, the first handover request message carries an emergency call indication, which is used to instruct the MSC to hand over the UE from the LTE network to the CS domain of the 3G network for the emergency call, and the first handover request message further carries information about a cell of the 3G network or information about a cell that is of the LTE network and on which the UE currently camps; and
a selection unit, configured to select an emergency center for the UE according to the information about the cell of the 3G network or the information about the cell of the LTE network that is carried in the first handover request message received by the receiving unit.

14. The MSC according to claim 13, wherein:
the receiving unit is further configured to: before the selection unit selects the emergency center for the UE according to the information about the cell of the 3G network or the information about the cell of the LTE network that is carried in the first handover request message received by the receiving unit, receive a handover complete message sent by a base station of the 3G network, wherein the handover complete message is used to indicate that the UE has completed the handover from the LTE network to the CS domain of the 3G network; and
the receiving unit is further configured to receive an emergency call connection request message sent by the UE.

15. The MSC according to claim 13, wherein:
the selection unit is configured to query a domain name server, so as to select, for the UE, the emergency center corresponding to the information about the cell of the 3G network or the information about the cell of the LTE network.

16. The MSC according to claim 13, wherein the information about the cell of the 3G network comprises an identity of the cell of the 3G, and the information about the cell of the LTE network comprises an identity of the cell of the LTE network.

17. The MSC according to claim 13, further comprising a generation unit and a sending unit; wherein:
the generation unit is configured to generate a third handover request message, wherein the third handover request message is used to request the base station of the 3G network to allocate a CS domain resource to the UE for the handover to the CS domain of the 3G network;

the sending unit is further configured to send the third handover request message to the base station of the 3G network;

the receiving unit is further configured to receive a third handover request response message sent by the base station of the 3G network, wherein the third handover request response message comprises information about the CS domain radio resource that is allocated by the base station of the 3G network to the UE for the handover to the CS domain of the 3G network;

the generation unit is further configured to generate a first handover response message, wherein the first handover response message comprises the information about the CS domain radio resource; and the sending unit is further configured to send the first handover response message to the MME.

18. The MSC according to claim 13, wherein:

the generation unit is further configured to generate a third handover request message, wherein the third handover request message is used to request the base station of the 3G network to hand over the UE from the LTE network to the CS domain of the 3G network for the CSFB;

the sending unit is further configured to send the third handover request message to the base station of the 3G network;

the receiving unit is further configured to receive a third handover request acknowledgement message sent by the base station of the 3G network, wherein the third handover request acknowledgement message comprises a radio access bearer (RAB), and the RAB is a RAB whose domain identifier indicates a packet switched (PS) domain, or the RAB is a PS RAB;

the generation unit is further configured to generate a first handover request response message, wherein the first handover request response message comprises the RAB; and the sending unit is further configured to send the first handover request response message to the MME.

* * * * *